(12) United States Patent
Graves et al.

(10) Patent No.: US 11,853,733 B2
(45) Date of Patent: *Dec. 26, 2023

(54) GRAPHICAL USER INTERFACE AND SYSTEM FOR DEFINING AND MAINTAINING CODE-BASED POLICIES

(71) Applicant: Styra, Inc., Redwood City, CA (US)

(72) Inventors: Mikol Graves, San Francisco, CA (US); Peter J. Shepherd, San Jose, CA (US); Magnus Hei-Yu Ma, San Francisco, CA (US); Timothy L. Hinrichs, Los Altos, CA (US); Teemu Koponen, San Francisco, CA (US)

(73) Assignee: STYRA, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,358

(22) Filed: Nov. 27, 2022

(65) Prior Publication Data

US 2023/0102477 A1 Mar. 30, 2023

Related U.S. Application Data

(63) Continuation of application No. 17/239,334, filed on Apr. 23, 2021, now Pat. No. 11,513,778.

(Continued)

(51) Int. Cl.
*G06F 8/41* (2018.01)
*G06F 8/73* (2018.01)
(Continued)

(52) U.S. Cl.
CPC .............. *G06F 8/427* (2013.01); *G06F 8/38* (2013.01); *G06F 8/71* (2013.01); *G06F 8/73* (2013.01)

(58) Field of Classification Search
CPC ... G06F 8/71; G06F 8/38; G06F 8/427; G06F 8/73

See application file for complete search history.

(56) References Cited

U.S. PATENT DOCUMENTS 5,974,549 A 10/1999 Golan
6,985,953 B1 1/2006 Sandhu et al.
(Continued)

OTHER PUBLICATIONS

Author Unknown, "API Best Practices Managing the API Lifecycle: Design, Delivery, and Everything in Between," Dec. 2016, 37 pages, Apigee, retrieved from https://pages.apigee.com/rs/351-WXY-166/images/API-Best-Practices-ebook-2016-12.pdf.

(Continued)

*Primary Examiner* — Wei Y Zhen
*Assistant Examiner* — Amir Soltanzadeh
(74) *Attorney, Agent, or Firm* — ADELI LLP

(57) ABSTRACT

Some embodiments of the invention provide a method for defining code-based policies. The method generates a policy-builder first view of a policy for display in a graphical user interface (GUI) by processing a syntax tree that is generated from a code second view of the policy. The method receives, through the policy-builder first view, a modification to a portion of the policy. To reflect the modification, the method updates a portion of the syntax tree that corresponds to the portion of the policy that is affected by the modification. Based on the updating of the syntax tree, the method updates the code second view by modifying a portion of the code second view that corresponds to the updated portion of the syntax tree.

15 Claims, 22 Drawing Sheets

Related U.S. Application Data

(60) Provisional application No. 63/075,036, filed on Sep. 4, 2020, provisional application No. 63/066,112, filed on Aug. 14, 2020.

(51) Int. Cl.
  *G06F 8/71* (2018.01)
  *G06F 8/38* (2018.01)

(56) References Cited

U.S. PATENT DOCUMENTS

| | | | |
|---|---|---|---|
| 7,043,659 | B1 | 5/2006 | Klein et al. |
| 7,096,367 | B2 | 8/2006 | Garg et al. |
| 7,124,192 | B2 | 10/2006 | High, Jr. et al. |
| 7,752,661 | B2 | 7/2010 | Hemsath et al. |
| 7,913,300 | B1 | 3/2011 | Flank et al. |
| 8,266,694 | B1 | 9/2012 | Roy |
| 8,613,070 | B1 | 12/2013 | Borzycki et al. |
| 8,683,560 | B1 | 3/2014 | Brooker et al. |
| 8,789,138 | B2 | 7/2014 | Reierson et al. |
| 9,397,990 | B1 | 7/2016 | Taly et al. |
| 9,530,020 | B2 | 12/2016 | Brandwine et al. |
| 9,648,040 | B1 | 5/2017 | Morkel et al. |
| 10,122,757 | B1 | 11/2018 | Kruse et al. |
| 10,127,393 | B2 | 11/2018 | Ferraiolo et al. |
| 10,182,129 | B1 | 1/2019 | Peterson et al. |
| 10,257,184 | B1 | 4/2019 | Mehta et al. |
| 10,353,726 | B2 | 7/2019 | Puan |
| 10,454,975 | B1 | 10/2019 | Mehr |
| 10,469,314 | B2 | 11/2019 | Ennis, Jr. et al. |
| 10,574,699 | B1 | 2/2020 | Baer et al. |
| 10,592,302 | B1 | 3/2020 | Hinrichs et al. |
| 10,592,683 | B1 | 3/2020 | Lim et al. |
| 10,715,514 | B1 | 7/2020 | Threlkeld |
| 10,719,373 | B1 | 7/2020 | Koponen et al. |
| 10,740,470 | B2 * | 8/2020 | Ionescu .............. G06F 21/577 |
| 10,789,220 | B2 | 9/2020 | Mayer et al. |
| 10,984,133 | B1 | 4/2021 | Hinrichs et al. |
| 10,986,131 | B1 | 4/2021 | Kruse et al. |
| 10,990,702 | B1 | 4/2021 | Hinrichs et al. |
| 11,023,292 | B1 | 6/2021 | Hinrichs et al. |
| 11,080,410 | B1 | 8/2021 | Sandall et al. |
| 11,108,827 | B2 | 8/2021 | Beckman et al. |
| 11,108,828 | B1 | 8/2021 | Curtis et al. |
| 11,170,099 | B1 | 11/2021 | Sandall et al. |
| 11,245,728 | B1 | 2/2022 | Curtis et al. |
| 11,258,824 | B1 | 2/2022 | Hinrichs et al. |
| 11,327,815 | B1 | 5/2022 | Koponen et al. |
| 11,470,121 | B1 | 10/2022 | Curtis et al. |
| 11,477,238 | B1 | 10/2022 | Curtis et al. |
| 11,477,239 | B1 | 10/2022 | Curtis et al. |
| 11,494,518 | B1 | 11/2022 | Curtis et al. |
| 11,496,517 | B1 | 11/2022 | Hinrichs et al. |
| 11,502,992 | B1 | 11/2022 | Koponen et al. |
| 11,513,778 | B1 | 11/2022 | Graves et al. |
| 11,520,579 | B1 | 12/2022 | Narkar et al. |
| 11,604,684 | B1 | 3/2023 | Hinrichs et al. |
| 2004/0083367 | A1 | 4/2004 | Garg et al. |
| 2007/0156670 | A1 | 7/2007 | Lim |
| 2008/0184336 | A1 | 7/2008 | Sarukkai et al. |
| 2009/0063665 | A1 | 3/2009 | Bagepalli et al. |
| 2009/0077618 | A1 | 3/2009 | Pearce et al. |
| 2009/0281996 | A1 | 11/2009 | Liu et al. |
| 2010/0281462 | A1 | 11/2010 | Festa |
| 2010/0333079 | A1 | 12/2010 | Sverdlov et al. |
| 2011/0113484 | A1 | 5/2011 | Zeuthen |
| 2012/0030354 | A1 | 2/2012 | Razzaq et al. |
| 2012/0117608 | A1 | 5/2012 | Metke et al. |
| 2012/0144295 | A1 | 6/2012 | Clark et al. |
| 2012/0311672 | A1 | 12/2012 | Connor et al. |
| 2012/0331539 | A1 | 12/2012 | Matsugashita |
| 2013/0226970 | A1 | 8/2013 | Weber et al. |
| 2014/0032691 | A1 | 1/2014 | Barton et al. |
| 2014/0032759 | A1 | 1/2014 | Barton et al. |
| 2014/0033267 | A1 | 1/2014 | Aciicmez |
| 2014/0237594 | A1 | 8/2014 | Thakadu et al. |
| 2015/0089575 | A1 | 3/2015 | Vepa et al. |
| 2015/0244724 | A1 | 8/2015 | Xu et al. |
| 2016/0057107 | A1 | 2/2016 | Call et al. |
| 2016/0188898 | A1 | 6/2016 | Karinta et al. |
| 2017/0111336 | A1 | 4/2017 | Davis et al. |
| 2017/0161120 | A1 | 6/2017 | Sasaki et al. |
| 2017/0220370 | A1 | 8/2017 | Klompje et al. |
| 2017/0237729 | A1 | 8/2017 | Uppalapati |
| 2017/0346807 | A1 | 11/2017 | Blasi |
| 2017/0364702 | A1 | 12/2017 | Goldfarb et al. |
| 2018/0067790 | A1 | 3/2018 | Chheda et al. |
| 2018/0082053 | A1 | 3/2018 | Brown et al. |
| 2018/0109538 | A1 | 4/2018 | Kumar et al. |
| 2018/0309746 | A1 | 10/2018 | Blasi |
| 2019/0007418 | A1 | 1/2019 | Cook et al. |
| 2019/0007443 | A1 | 1/2019 | Cook et al. |
| 2019/0080103 | A1 | 3/2019 | Hadzic et al. |
| 2019/0230130 | A1 | 7/2019 | Beckman et al. |
| 2019/0236975 | A1 | 8/2019 | Chong et al. |
| 2019/0245862 | A1 | 8/2019 | Kruse et al. |
| 2019/0386973 | A1 | 12/2019 | Patwardhan et al. |
| 2020/0007580 | A1 | 1/2020 | Liderman et al. |
| 2021/0029029 | A1 | 1/2021 | Mehmedagic et al. |
| 2021/0240550 | A1 | 8/2021 | Hinrichs et al. |
| 2021/0248017 | A1 | 8/2021 | Hinrichs et al. |
| 2021/0365571 | A1 | 11/2021 | Sandall et al. |
| 2022/0269549 | A1 | 8/2022 | Koponen et al. |

OTHER PUBLICATIONS

Costa, Jeff, "Improve API Performance with Caching," API Gateway, May 3, 2018, 18 pages, Akamai Developer, retrieved from https://developer.akamai.com/blog/2018/05/31/improve-api-performance-caching.

Non-Published commonly Owned U.S. Appl. No. 16/050,119, filed Jul. 31, 2018, 55 pages, Styra, Inc.

Non-Published commonly Owned U.S. Appl. No. 16/050,143, filed Jul. 31, 2018, 56 pages, Styra, Inc.

Win, Thu Yein, et al., "Virtualization Security Combining Mandatory Access Control and Virtual Machine Introspection," 2014 IEEE/ACM 7th International Conference on Utility and Cloud Computing, Dec. 8-11, 2014, 6 pages, IEEE, London, UK.

Moffett, Jonathan D., et al., "Policy Hierarchies for Distributed Systems Management," IEEE Journal on Selected Areas in Communications, Dec. 1993, 11 pages, vol. 11, IEEE, USA.

Non-Published Commonly Owned U.S. Appl. No. 18/120,810, filed Mar. 13, 2023, 63 pages, Styra, Inc.

* cited by examiner

| | | 701A |
|---|---|---|
| | | |

710 — Policy Builder View | Code View

720 — Package [finance.salary]

730 — Imports [data.subordinates ▼]  ⊖ ⊕

Add Rule ⊕

Rule [allow ▼] [is] [true ▼]   Add Condition ⊕

732:
- when [some ▼] [username]   ⊖ ⊕
- and [input.method ▼] [is ▼] ["GET" ▼]   ⊖ ⊕
- and [input.path ▼] [matches ▼] [["finance", "salary", username] ▼]   ⊖ ⊕
- and [input.user ▼] [is ▼] [username ▼]   ⊖ ⊕

Or   ⊖ ⊕

734:
- when [some ▼] [username]   ⊖ ⊕
- and [input.method ▼] [is ▼] ["GET" ▼]   ⊖ ⊕
- and [input.path ▼] [matches ▼] [["finance", "salary", username] ▼]   ⊖ ⊕
- and [has_subordinate(input.path, username) ▼]   ⊖ ⊕

Add or ⊕

736 — Otherwise [allow ▼] [is] [false ▼]   ⊖ Delete rule

Add Rule ⊕
Add Function ⊕

740 — Function [has_subordinate ▼] [is] [true ▼]   ⊕

742:
- when [arguments] [user, subordinate]   ⊖ ⊕
- and [subordinates[user] [_] ▼] [is ▼] [subordinate ▼]   ⊖ ⊕

Add else ⊕
⊖ Delete function

Add Function ⊕

*Figure 7A*

```
Policy Builder View | Code View 1  package finance.salary
 2
 3  default allow = false
 4
 5  # Authorize users to get their own salary.
 6  allow {
 7    some username
 8    input.method == "GET"
 9    input.path = ["finance", "salary", username]
10    input.user == username
11  }
12
13  import data.subordinates
14
15  has_subordinate(user, subordinate) {
16    subordinates[user] [_] == subordinate
17  }
18
19  # Authorize managers to get their subordinates' salaries.
20  allow {
21    some username
22    input.method == "GET"
23    input.path = ["finance", "salary", username]
24    has_subordinate(input.user, username)
25  }
```

| Policy Builder View | Code View |

710

720 — Package | finance.salary

Imports | data.human_resources ▼ | ⊖ ⊕
| data.subordinates ▼ | ⊖ ⊕

730 ——————————————————————— Add Rule ⊕

Rule | allow ▼ | is | true ▼ | Add Condition ⊕
• when | some ▼ | username | ⊖ ⊕
732 • and | input.method ▼ | is ▼ | "GET" ▼ | ⊖ ⊕
• and | input.path ▼ | matches ▼ | ["finance", "salary", username] ▼ | ⊖ ⊕
• and | input.user ▼ | is ▼ | username ▼ | ⊖ ⊕

Or ⊖ ⊕

• when | some ▼ | username | ⊖ ⊕
• and | input.method ▼ | is ▼ | "GET" ▼ | ⊖ ⊕
734 • and | input.path ▼ | matches ▼ | ["finance", "salary", username] ▼ | ⊖ ⊕
• and | has_subordinate(input.path, username) ▼ | ⊖ ⊕

Add or ⊕

736 — Otherwise | allow ▼ | is | false ▼ | ⊖ Delete rule

Add Rule ⊕
740 ——————————————————————— Add Function ⊕

Function | has_subordinate ▼ | is | true ▼ | ⊕
• when | arguments | user, subordinate | ⊖ ⊕
742 • and | subordinates[user] [_] ▼ | is ▼ | subordinate ▼ | ⊖ ⊕

Add else ⊕
⊖ Delete function

Add Function ⊕

| Policy Builder View | Code View |

```
1   package finance.salary
2
3   import data.human_resources
4
5   default allow = false
6
7   # Authorize users to get their own salary.
8   allow {
9     some username
10    input.method == "GET"
11    input.path = ["finance", "salary", username]
12    input.user == username
13  }
14
15  import data.subordinates
16
17  has_subordinate(user, subordinate) {
18    subordinates[user] [_] == subordinate
19  }
20
21  # Authorize managers to get their subordinates' salaries.
22  allow {
23    some username
24    input.method == "GET"
25    input.path = ["finance", "salary", username]
26    has_subordinate(input.user, username)
27  }
28
29
30
31
32
33
34
35
36
37
38
39
40
```

| Policy Builder View | Code View |

710

720 — Package | finance.salary |

Imports | data.human_resources ▼ | ⊖ ⊕
| data.subordinates ▼ | ⊖ ⊕

Add Rule ⊕

730

Rule | allow ▼ | is | true ▼ | Add Condition ⊕
• when | some ▼ | username | ⊖ ⊕
732 — • and | input.method ▼ | is ▼ | "GET" ▼ | ⊖ ⊕
• and | input.path ▼ | matches ▼ | ["finance", "salary", username] ▼ | ⊖ ⊕
• and | input.user ▼ | is ▼ | username ▼ | ⊖ ⊕

Or

• when | some ▼ | username | ⊖ ⊕
• and | input.method ▼ | is ▼ | "GET" ▼ | ⊖ ⊕
734 — • and | input.path ▼ | matches ▼ | ["finance", "salary", username] ▼ | ⊖ ⊕
• and | has_subordinate(input.path, username) ▼ | ⊖ ⊕

Add or ⊕

736 — Otherwise | allow ▼ | is | false ▼ | ⊖ Delete rule

Add Rule ⊕
740 — Add Function ⊕

Function | has_subordinate ▼ | is | true ▼ | ⊕
• when | arguments | user, subordinate | ⊖ ⊕
742 — • and | subordinates[user] [_] ▼ | is ▼ | subordinate ▼ | ⊖ ⊕

Add else ⊕
744 — ⊖ Delete function

Function | has_subordinate ▼ | is | true ▼ | ⊕
• when | arguments | user | ⊖ ⊕
746 — • and | user ▼ | is ▼ | human_resources[_] ▼ | ⊖ ⊕

Add else ⊕
⊖ Delete function

Add Function ⊕

| Policy Builder View | Code View |

```
1   package finance.salary
2
3   import data.human_resources
4
5   default allow = false
6
7   # Authorize users to get their own salary.
8   allow {
9     some username
10    input.method == "GET"
11    input.path = ["finance", "salary", username]
12    input.user == username
13  }
14
15  import data.subordinates
16
17  has_subordinate(user, subordinate) {
18    subordinates[user] [_] == subordinate
19  }
20
21  # Authorize managers to get their subordinates' salaries.
22  allow {
23    some username
24    input.method == "GET"
25    input.path = ["finance", "salary", username]
26    has_subordinate(input.user, username)
27  }
28
29  is_human_resources(user) {
30    user == human_resources[_]
31  }
32
33
34
35
36
37
38
39
40
```

710 — line 1
724 — line 3
736 — line 5
750 — line 7
732 — lines 8–13
722 — line 15
740 — lines 17–19
752 — line 21
734 — lines 22–27
744 — lines 29–31

*Figure 7F*

| Policy Builder View | Code View |

Package | finance.salary

Imports | data.human_resources
          | data.subordinates

Add Rule ⊕

Rule | allow ▼ | is ▼ | true ▼ | Add Condition ⊕
• when | some ▼ | username
• and | input.method ▼ | is ▼ | "GET" ▼
• and | input.path ▼ | matches ▼ | ["finance", "salary", username] ▼
• and | input.user ▼ | is ▼ | username ▼

Or
• when | some ▼ | username
• and | input.method ▼ | is ▼ | "GET" ▼
• and | input.path ▼ | matches ▼ | ["finance", "salary", username] ▼
• and | has_subordinate(input.path, username) ▼

Or
• when | input.method ▼ | is ▼ | "GET" ▼
• and | input.path ▼ | matches ▼ | ["finance", "salary", username] ▼
• and | is_human_resources (input.user) ▼

Add or ⊕

Otherwise | allow ▼ | is ▼ | false ▼    ⊖ Delete rule

Add Rule ⊕
Add Function ⊕

Function | has_subordinate ▼ | is ▼ | true ▼
• when | arguments | user, subordinate
• and | subordinates[user] [_] ▼ | is ▼ | subordinate ▼

Add else ⊕
⊖ Delete function

Function | has_subordinate ▼ | is ▼ | true ▼
• when | arguments | user
• and | user ▼ | is ▼ | human_resources[_] ▼

Add else ⊕
⊖ Delete function

Add Function ⊕

| Policy Builder View | Code View |

```
 1  package finance.salary
 2
 3  import data.human_resources
 4
 5  default allow = false
 6
 7  # Authorize users to get their own salary.
 8  allow {
 9    some username
10    input.method == "GET"
11    input.path = ["finance", "salary", username]
12    input.user == username
13  }
14
15  import data.subordinates
16
17  has_subordinate(user, subordinate) {
18     subordinates[user] [_] == subordinate
19  }
20
21  # Authorize managers to get their subordinates' salaries.
22  allow {
23    some username
24    input.method == "GET"
25    input.path = ["finance", "salary", username]
26    has_subordinate(input.user, username)
27  }
28
29  # Authorize HR members to get anyone's salary.
30  allow {
31    input.method == "GET"
32    input.path = ["finance", "salary", _]
33    is_human_resources(input.user)
34  }
35
36  is_human_resources(user) {
37     user == human_resources[_]
38  }
39
40
```

GRAPHICAL USER INTERFACE AND SYSTEM FOR DEFINING AND MAINTAINING CODE-BASED POLICIES

CLAIM OF BENEFIT TO PRIOR APPLICATIONS

This application is a continuation application of U.S. patent application Ser. No. 17/239,334, filed Apr. 23, 2021, now issued as U.S. Pat. No. 11,513,778. U.S. patent application Ser. No. 17/239,334 claims the benefit of U.S. Provisional Patent Application 63/075,036, filed Sep. 4, 2020 and U.S. Provisional Patent Application 63/066,112, filed Aug. 14, 2020. U.S. patent application Ser. No. 17/239,334, now issued as U.S. Pat. No. 11,513,778, is incorporated herein by reference.

BACKGROUND

Typical applications for defining code-based policies do not currently provide tools for allowing casual or infrequent users to author and maintain policies. In order for these applications to be useable, users have to become well-versed in the applications and/or coding languages used to define the policies through these applications. Thus, the current applications present a number of challenges, including a lack of source control for maintaining consistency of the policies regardless of the skill level of the author(s). Without a way to provide tools to users of all skill levels for authoring policies while still maintaining consistency of the policy, the ability of client users to successfully use these applications is severely limited, particularly for those with minimal policy-authoring experience.

BRIEF SUMMARY

Some embodiments of the invention provide a policy building application for defining code-based policies in a network. The policy building application generates a policy-builder first view of a policy for display in a graphical user interface (GUI) by processing a syntax tree that is generated from a code second view of the policy. The policy building application receives, through the policy-builder first view, a modification to a portion of the policy. To reflect the modification, the policy builder application updates a portion of the syntax tree that corresponds to the portion of the policy that is affected by the modification. Based on the updating of the syntax tree, the policy building application updates the code second view by modifying a portion of the code second view that corresponds to the updated portion of the syntax tree.

In some embodiments, the policy is a collection of rules in a namespace. The policy includes multiple components, in some embodiments, which are displayed in a first order within the policy-builder view, a second order within the code second view, and interleaved in a third order in the syntax tree. The components in some embodiments include imports, rules, and functions. While the second and third orders may vary, the first order groups imports, then rules, then functions, according to some embodiments. The modification to the policy portion in some embodiments modifies at least one component of the policy. In some such embodiments, updating the syntax tree and the code second view includes updating the portion of the syntax tree and code second view relating to the modified component of the policy.

The functions, in some embodiments, are defined as rules that can accept arguments. Unlike rules, however, the functions cannot be entry points to a decision and cannot be called by APIs (application programing interfaces) for a decision. In some embodiments, the functions can be called by rules. The imports in some embodiments can include other policy packages, pre-defined rules (e.g., rules from other policy packages), and data from one or more data sources or a JSON (JavaScript Object Notation) file. The imports will be evaluated in the context of the policy in which they are imported, according to some embodiments.

The GUI in some embodiments includes a set of selectable menu options for toggling between the policy-builder view and the code view. The code view, in some embodiments, displays a set of source code that defines the policy. In some embodiments, components can be inserted anywhere, in any order, through the code second view. Conversely, components can only be inserted within their groupings through the policy-builder first view to ensure a consistent view of the policy. Additionally, while the components can be inserted anywhere, and in any order, within the code second view, they will be displayed in the policy-builder first view in the first order mentioned above (i.e., grouped by imports, then rules, then functions) regardless of where they are inserted in the code second view. In other words, if a user inserts a rule above a function in the code second view, the inserted rule will appear below all of the imports and grouped with the rest of the rules in the policy-builder first view. On the other hand, since the components cannot be rearranged outside of their own groupings in the policy-builder first view, modifications made in the policy-builder first view will be interleaved in the code second view in the same order they appear in the policy-builder first view.

In order to update a portion of the syntax tree, the policy building application in some embodiments identifies, within the set of source code, a range of code that is affected by the modification (i.e., a first affected position of code through a last affected position of code). The policy building application in some embodiments examines an unmodified version of the syntax tree within the affected range in order to identify one or more comments within the affected range. After identifying the one or more comments, the policy building application in some embodiments updates the syntax tree that includes the modification with the identified one or more comments.

In some embodiments, updating the code second view by modifying a portion of the code second view that corresponds to the updated portion of the syntax tree includes converting the updated syntax tree into a set of human-readable source code. The policy building application then compares the converted syntax tree with a set of existing source code (e.g., the set of source code in the code second view) within the affected range in order to identify differences, according to some embodiments. In some such embodiments, the policy building application computes a patch that includes the identified differences and merges the patch with the set of existing source code in order to update the code second view. Modifying the policy by merging a patch that includes the modification with the existing set of source code, the method ensures that consistency of the code is maintained and that only the portions of the code that are affected by the modification will be updated.

In order to generate the syntax tree from the code second view, the policy building application in some embodiments parses the set of code from the code second view, and then processes the syntax tree generated from the parse to use it as a data model to generate the policy-builder first view for the GUI. In some embodiments, the policy building application parses the policy each time a modification is made to the policy. As such, merging the patch with the set of existing code in some embodiments triggers a parse of the policy, and thus, generates an updated policy-builder first view for display in the GUI.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF FIGURES

The novel features of the invention are set forth in the appended claims. However, for purposes of explanation, several embodiments of the invention are set forth in the following figures.

FIGS. 7A-7H illustrate different states of the code view and the policy builder view for a policy in some embodiments as a user modifies the policy through the policy builder view.

DETAILED DESCRIPTION

Figure 1:
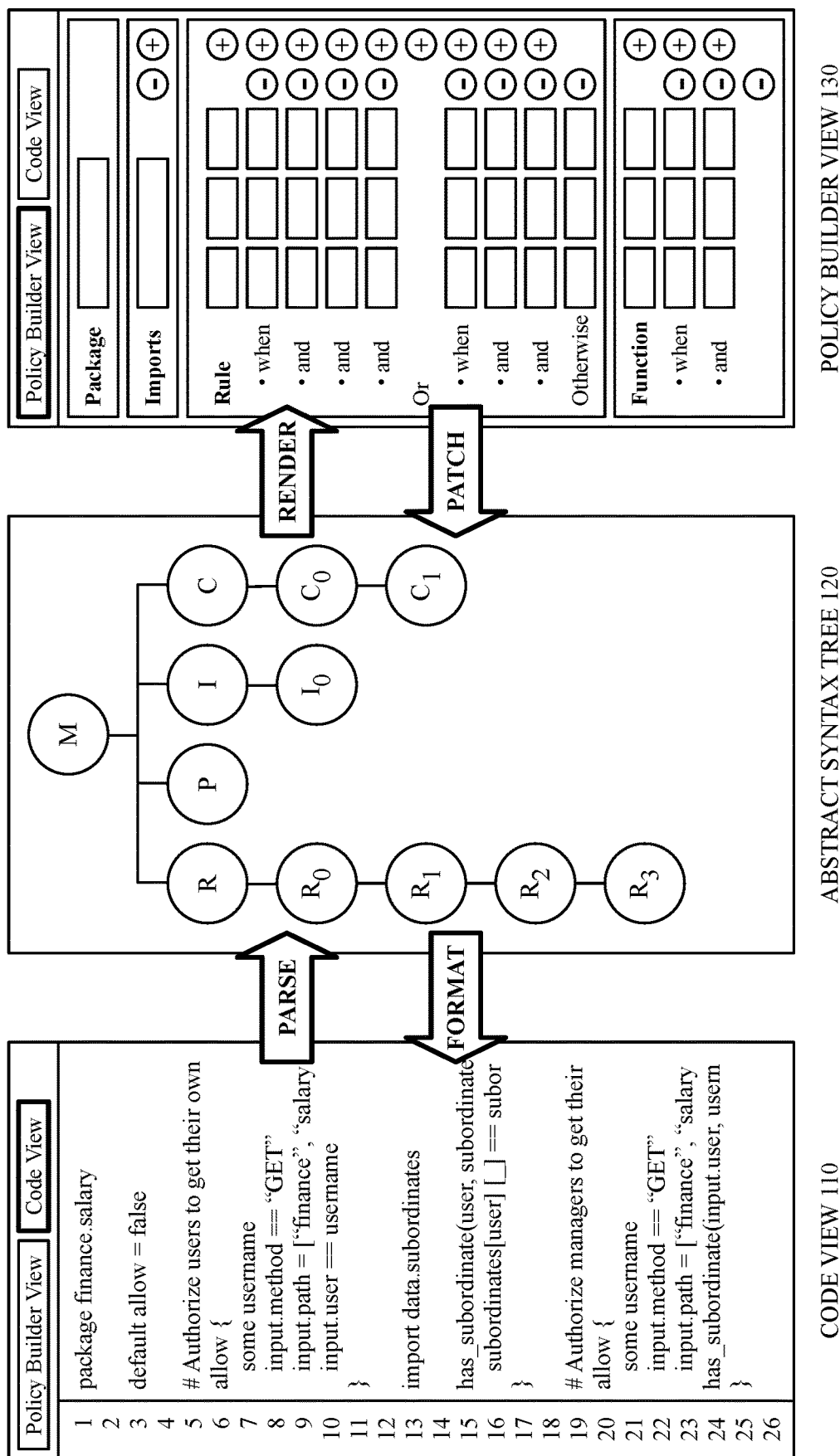
FIG. 1 conceptually illustrates a system for defining and maintaining policies through a policy building application, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a policy building application for defining code-based policies in a network. The policy building application generates a policy-builder first view of a policy for display in a graphical user interface (GUI) by processing a syntax tree that is generated from a code second view of the policy. The policy building application receives, through the policy-builder first view, a modification to a portion of the policy. To reflect the modification, the policy builder application updates a portion of the syntax tree that corresponds to the portion of the policy that is affected by the modification. Based on the updating of the syntax tree, the policy building application updates the code second view by modifying a portion of the code second view that corresponds to the updated portion of the syntax tree.

In some embodiments, the policy is a collection of rules in a namespace. The policy includes multiple components, in some embodiments, which are displayed in a first order within the policy-builder view, a second order within the code second view, and interleaved in a third order in the syntax tree. The components in some embodiments include imports, rules, and functions. While the second and third orders may vary, the first order groups imports, then rules, then functions, according to some embodiments. The modification to the policy portion in some embodiments modifies at least one component of the policy. In some such embodiments, updating the syntax tree and the code second view includes updating the portion of the syntax tree and code second view relating to the modified component of the policy.

The functions, in some embodiments, are defined as rules that can accept arguments. Unlike rules, however, the functions cannot be entry points to a decision and cannot be called by APIs (application programing interfaces) for a decision. In some embodiments, the functions can be called by rules. The imports in some embodiments can include other policy packages, pre-defined rules (e.g., rules from other policy packages), and data from one or more data sources or a JSON (JavaScript Object Notation) file. The imports will be evaluated in the context of the policy in which they are imported, according to some embodiments.

The GUI in some embodiments includes a set of selectable menu options for toggling between the policy-builder view and the code view. The code view, in some embodiments, displays a set of source code that defines the policy. In some embodiments, components can be inserted anywhere, in any order, through the code second view. Conversely, components can only be inserted within their groupings through the policy-builder first view to ensure a consistent view of the policy. Additionally, while the components can be inserted anywhere, and in any order, within the code second view, they will be displayed in the policy-builder first view in the first order mentioned above (i.e., grouped by imports, then rules, then functions) regardless of where they are inserted in the code second view. In other words, if a user inserts a rule above a function in the code second view, the inserted rule will appear below all of the imports and grouped with the rest of the rules in the policy-builder first view. On the other hand, since the components cannot be rearranged outside of their own groupings in the policy-builder first view, modifications made in the policy-builder first view will be interleaved in the code second view in the same order they appear in the policy-builder first view.

In order to update a portion of the syntax tree, the policy building application in some embodiments identifies, within the set of source code, a range of code that is affected by the modification (i.e., a first affected position of code through a last affected position of code). The policy building application in some embodiments examines an unmodified version of the syntax tree within the affected range in order to identify one or more comments within the affected range.

After identifying the one or more comments, the policy building application in some embodiments updates the syntax tree that includes the modification with the identified one or more comments.

In some embodiments, updating the code second view by modifying a portion of the code second view that corresponds to the updated portion of the syntax tree includes converting the updated syntax tree into a set of human-readable source code. The policy building application then compares the converted syntax tree with a set of existing source code (e.g., the set of source code in the code second view) within the affected range in order to identify differences, according to some embodiments. In some such embodiments, the policy building application computes a patch that includes the identified differences and merges the patch with the set of existing source code in order to update the code second view. Modifying the policy by merging a patch that includes the modification with the existing set of source code, the method ensures that consistency of the code is maintained and that only the portions of the code that are affected by the modification will be updated.

In order to generate the syntax tree from the code second view, the policy building application in some embodiments parses the set of code from the code second view, and then processes the syntax tree generated from the parse to use it as a data model to generate the policy-builder first view for the GUI. In some embodiments, the policy building application parses the policy each time a modification is made to the policy. As such, merging the patch with the set of existing code in some embodiments triggers a parse of the policy, and thus, generates an updated policy-builder first view for display in the GUI.

FIG. 1 illustrates a policy building application system 100 of some embodiments for defining and modifying code-based policies. As shown, the system 100 includes a code view 110, a syntax tree 120, and a policy builder view 130. The code view 110 and the policy builder view 130 are the views available to a user through a GUI generated by the policy building application in some embodiments, while the abstract syntax tree 120 (also referred to herein as a syntax tree) is an illustrative example of a syntax tree generated from the code view and used to render the policy builder view 130.

The code view 110 of the policy building application in some embodiments displays a set of modifiable source code that defines the policy. In some embodiments, the code is written in a declarative language (e.g., Rego). Through the code view 110, the user can add, delete, or modify any portion of the policy, according to some embodiments. In some embodiments, when the policy building application receives a modification to the set of source code through the code view 110 (i.e., receives new input from a user), a parser (not shown) receives the modification and parses the set of source code including the modification to generate the syntax tree 120.

In some embodiments, the syntax tree 120 is organized by rules ("R"), policy statements ("P"), import statements ("I"), and comments ("C"). The rules also include functions, which are defined in some embodiments as rules that can accept arguments. In some embodiments, after the syntax tree 120 is generated from the parse, the policy building application uses the syntax tree 120 as a data model to render the policy builder view 130. Regardless of the order of the components of the policy within the code view 110 and the syntax tree 120, the policy builder view 130 in some embodiments will display the components in the particular order illustrated, with the policy name or handle at the top of the display, followed by any imports defined for the policy, followed by any rules defined for the policy, and concluding with any functions defined for the policy.

The policy builder view 130 provides multiple selectable tools and controls in some embodiments for modifying the policy. In some embodiments, when a user makes a modification to the policy through the policy builder view 130, the system 100 receives the modification as one or more fragments of the syntax tree (i.e., portions of the syntax tree affected by the modification). The system 100 in some embodiments adds the syntax tree fragments to the syntax tree 120 as a patch in order to make as few changes to the syntax tree as possible, and thus keep as much of the policy intact as possible.

In some embodiments, the system 100 then formats the code from the patched syntax tree and adds the formatted code back into the code view 110, which triggers a new parse of the policy to generate a new syntax tree (i.e., an updated version of the syntax tree). The new syntax tree is then used to render an updated policy builder view reflecting the modification. While the system 100 provides a simplified example of the policy building application, additional details and examples regarding the functions and components of the system 100 will be further described below.

Figure 2:
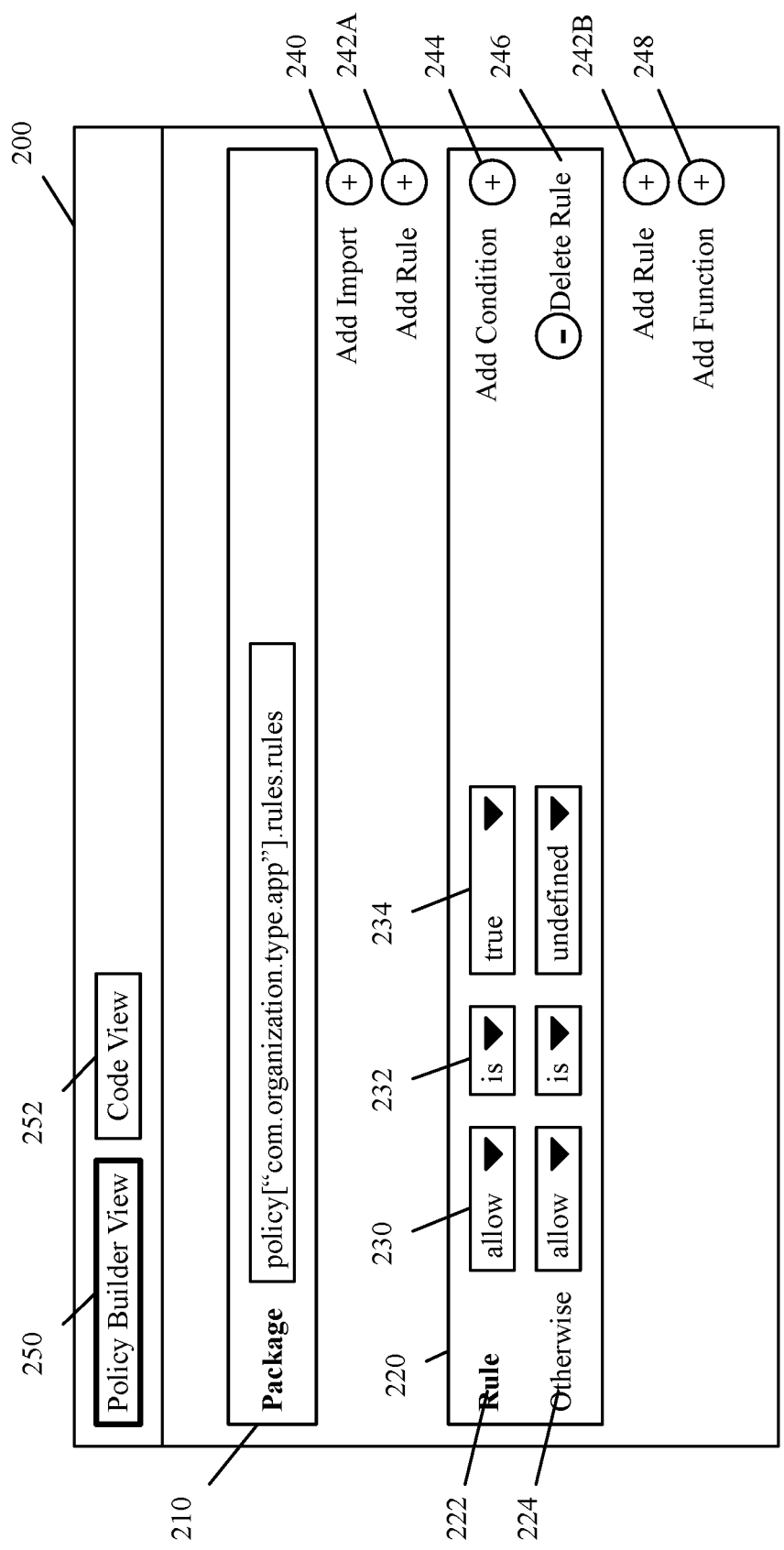
FIG. 2 conceptually illustrates an example GUI displaying a policy builder view for a policy, according to some embodiments.

FIG. 2 illustrates a GUI display 200 of some embodiments provided by the policy building application for defining code-based policies. When a user of the policy building application selects a policy to modify, or selects to build a new policy, the policy building application in some embodiments displays the policy builder view GUI 200. In this example, the GUI 200 features an existing policy "policy ["com.organization.type.app"].rules.rules" available for modification through the GUI. For the existing policy, the policy builder view GUI 200 displays a set of components 210-220 defining the policy, with each component including a set of rows for defining statements relevant to the component. For example, the component 220 includes rows 222-224.

Within each row, the policy building application of some embodiments displays a set of one or more selectable boxes for affecting the statements defined for the component, such as the combo boxes 230-234 in the row 222. In some embodiments, the rows also include a set of selectable controls for manipulating the row. Examples of these controls include the add import control 240, the add rule controls 242A-242B, the add condition control 244, the delete rule control 246, and the add function control 248. Some embodiments may include additional or fewer controls than those shown in the example GUI 200.

Some embodiments of the GUI 200 also include a set of menu options 250-252 for toggling between the current policy builder view and a code view, with the option 250 appearing with a thicker outline to denote that it is the currently selected view. Other embodiments may denote the currently selected view with a different appearance (e.g., different color, shading etc.), while still other embodiments may not distinguish between the selected view and non-selected view. As mentioned above, a user can modify the policy through either the policy builder view, or through the code view which allows the user to directly interact with and modify a set of code defining the policy, in some embodiments. Modifications made to the policy through the policy builder view in some embodiments are also interleaved in the code view, and vice versa. In order to maintain policy order and consistency in the code, some embodiments of the policy building application only update the lines or rows affected by the modifications. Examples illustrating modified policies will be provided and described further below.

Figure 3:
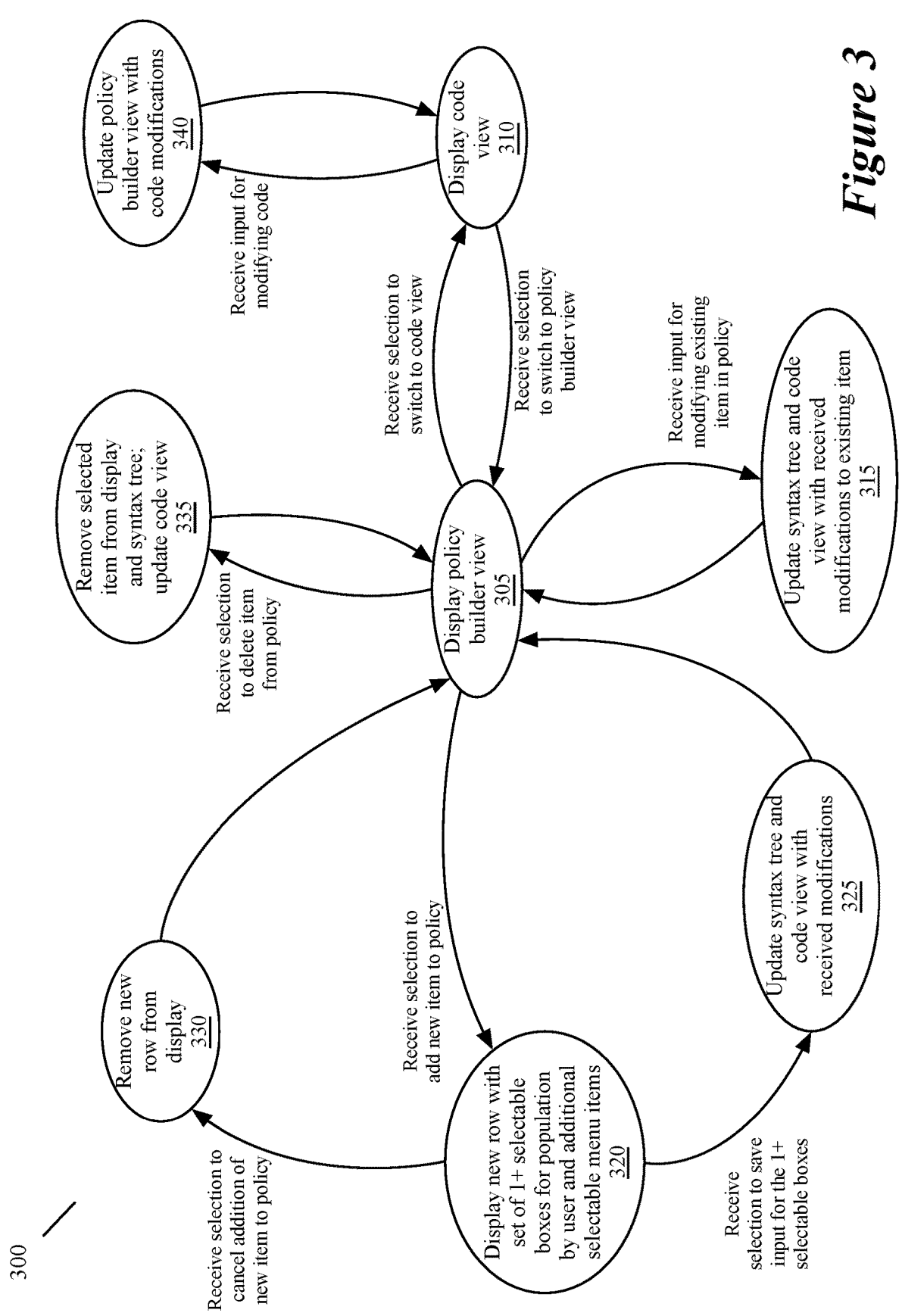
FIG. 3 conceptually illustrates a state diagram describing different states and transitions between these states of the policy building application of some embodiments.

FIG. 3 illustrates a state diagram 300 describing different states of the GUI 200 and transitions between these states in some embodiments of the policy building application. One of ordinary skill in the art will recognize that the policy building application of some embodiments will have many different states relating to all different types of input events, and that the state diagram 300 is specifically focused on a subset of these events. One of ordinary skill in the art will further recognize that various interactions, such as cursor controller gestures and button clicks, keyboard input, touchpad/trackpad input, etc., may be used for selection operations described herein.

The policy builder application is initially in state 305 in some embodiments, featuring a policy builder view in a GUI display for a policy (e.g., GUI 200 for policy 205). This may be the initial state of the policy builder application, in some embodiments, upon a user opening the display after selecting a policy to modify, selecting to build a new policy, or based on other actions. In this state, the only selected item is the option to view the policy builder view (e.g., policy builder view option 250), as is the case in FIG. 2.

From state 305, a user can perform numerous operations to modify the GUI display by selecting tools and/or boxes (e.g., combo boxes) within the display. For example, in some embodiments, a user may modify the input of a combo box for an existing rule or function. When the policy building application receives input for modifying an existing rule or function in the policy, the application transitions to state 315 to update the policy and the code view with the received modification to the existing rule or function (e.g., as described above in FIG. 1). An example of a modification in some embodiments may include a modification to an operator or operand for particular rule in a policy. The application then returns to state 305.

In some embodiments, a user may also select, from state 305, any one of the controls 240-248 to add an import, rule, or function to the policy. When the policy building application receives the selection to add one of these components to the policy, the application transitions to state 320 to display a new row for the added component with a set of one or more selectable boxes for population by the user. In some embodiments, for example, a user may select to add a new rule to the policy using either of the add rule controls 242 in the GUI 200.

From state 320, the user can populate the one or more selectable boxes in order to define the newly added component. When the policy building application receives a selection to save the input for the one or more selectable boxes, the application transitions to state 325 to update the policy and the code view with the added component. The application then returns to state 305. Alternatively, from state 320, the user can also select to cancel the addition of the component. When the policy building application receives a selection to cancel the addition of the new component from state 320, the application transitions to state 330 to remove the new row corresponding to the added component from the display. The policy building application then returns to state 305.

Similarly, the user can select to remove an existing component from the policy from state 305. For example, the user can select the delete rule control 246 to remove the rule 220 from the policy 205. When the policy building application receives a selection to delete a component from the policy, the application transitions to state 335 to remove the selected component from the display and policy, and also updates the code view to reflect the deletion. The application then transitions back to state 305.

From the state 305, the user can also select to switch to code view using the menu option 252. When the policy building application receives such a selection, the application transitions to state 310 to display the code view. As mentioned above, the code view in some embodiments displays a set of code that defines the policy. Any modifications made to the policy from the policy builder view will also be interleaved in the code view according to some embodiments. The user in some embodiments can then modify the set of source code from the code view.

When the policy building application receives the input modifying the set of code from state 310, the application transitions to 340 to update the policy builder view to reflect the modifications, and then returns to state 310. In some embodiments, when the policy building application updates the policy builder view with modifications made in the code view, only the portions of the policy that are affected by the modifications are updated. For example, in some embodiments, when the system 100 receives a modification to the policy through the code view 110, the system parses the modified code from the code view to generate an updated version of the syntax tree 120, and then uses the updated syntax tree to render an updated version of the policy builder view 130.

In some embodiments, regardless of where a user may insert or move imports, rules, and functions within the code view, the components will be interleaved within the policy builder view in the first order described above in order to maintain consistency of the code (i.e., grouped in order by imports, rules, and functions). While the components will be interleaved within the policy builder view in the first order, the individual components within their ordered groupings will be interleaved in the same order in which they appear in the code view, according to some embodiments. That is to say, if the code view for a particular policy displays a first rule, followed by first and second imports, and subsequently followed by a second rule, the policy builder view in some embodiments will display the first and second imports at the top of the display, followed by the first rule, which is then followed by the second rule (i.e., instead of the second rule being followed by the first rule) to maintain the order of the individual imports and rules within their respective groupings.

From state 310, the user can select (e.g., using menu option 250) to switch back to the policy builder view to see the modifications made through the code view interleaved in the policy builder view. When the policy building application receives such a selection, the application transitions back to the policy builder view in state 305. Additional details regarding how modifications made in code view are interleaved in the policy builder view, and vice versa, will be described below with reference to FIGS. 6-7H.

Figure 4:
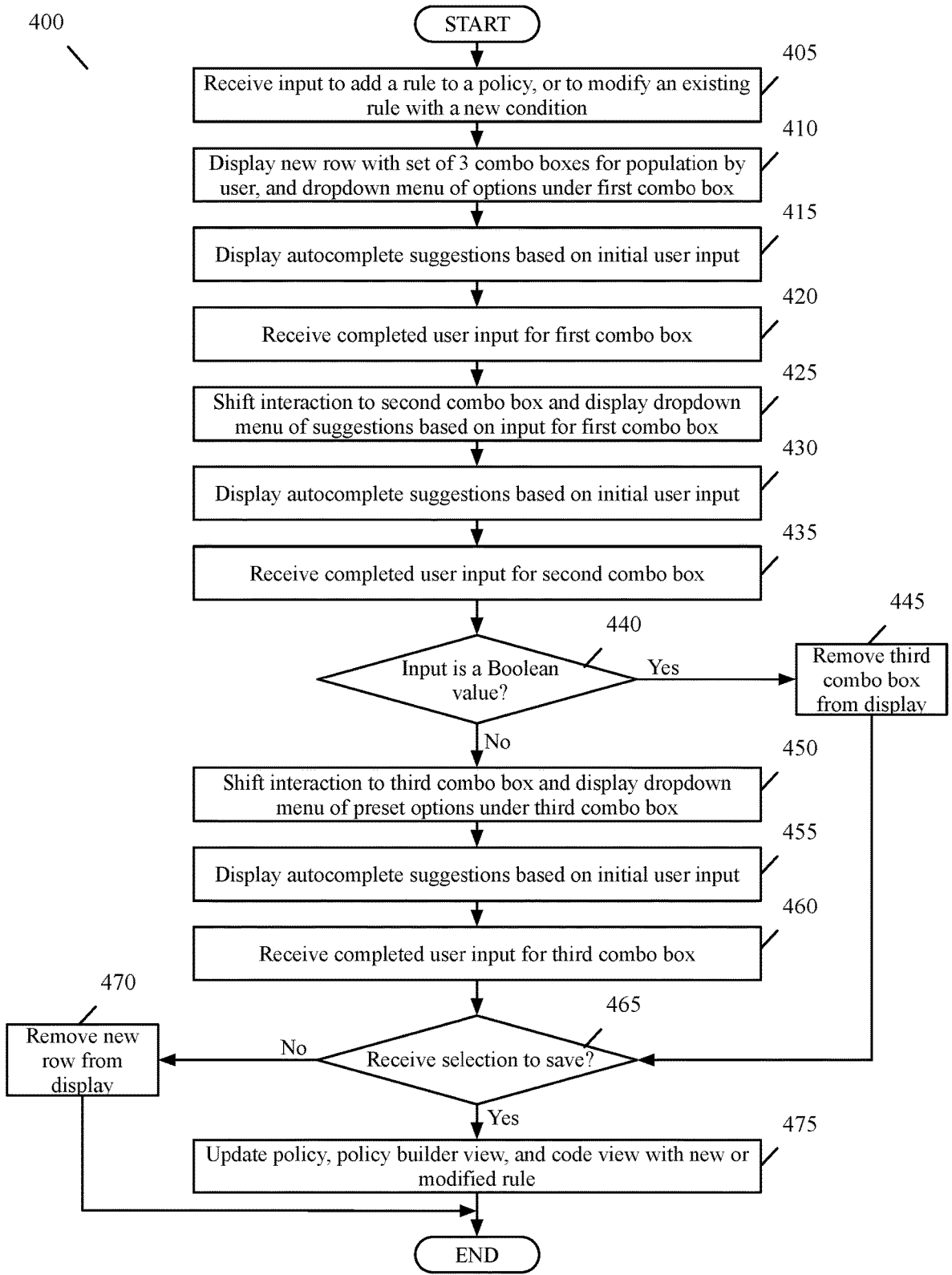
FIG. 4 illustrates a process performed by the policy building application in some embodiments when a user modifies a policy through the policy builder view.
Figure 5A:
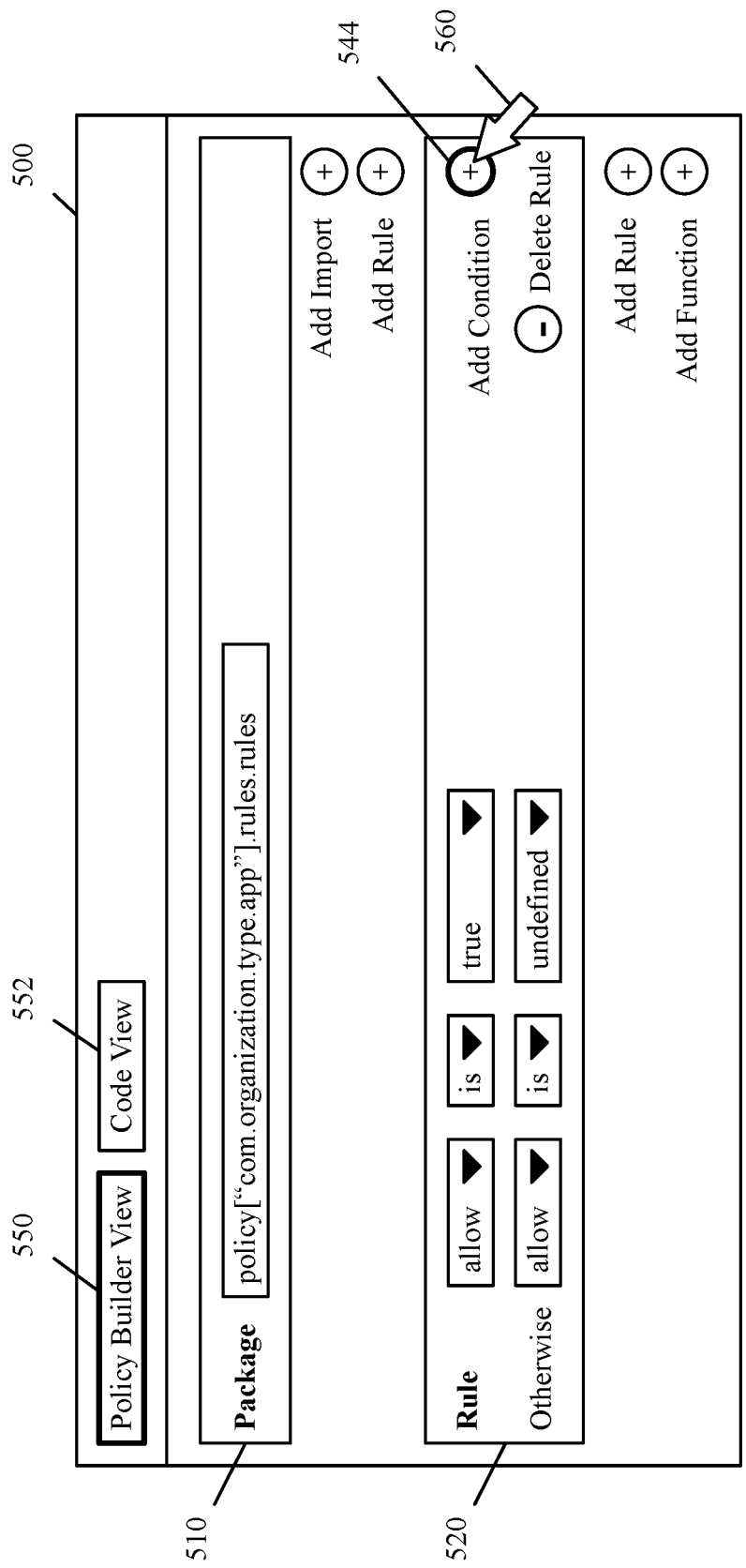
FIGS. 5A-5H illustrate different states of the policy builder view of the policy building application, with reference to FIG. 4, as a user modifies a policy, according to some embodiments.

FIG. 4 illustrates an example of a process performed by the policy builder application when a user adds a rule (i.e., rule or function) to a policy or modifies an existing rule through policy builder view in some embodiments. The process 400 will be described with reference to FIGS. 5A-5I1. As shown, the process 400 starts at 405 by receiving a selection to add a rule to a policy, or to modify an existing rule by adding a new condition or expression. For example, FIG. 5A illustrates a GUI display 500 similar to the GUI display 200. The GUI display 500 features a policy that includes a set of components 510-520. As shown, a user selects (e.g., via the cursor 560) the add condition control 544 within the existing rule 520.

Figure 5B:
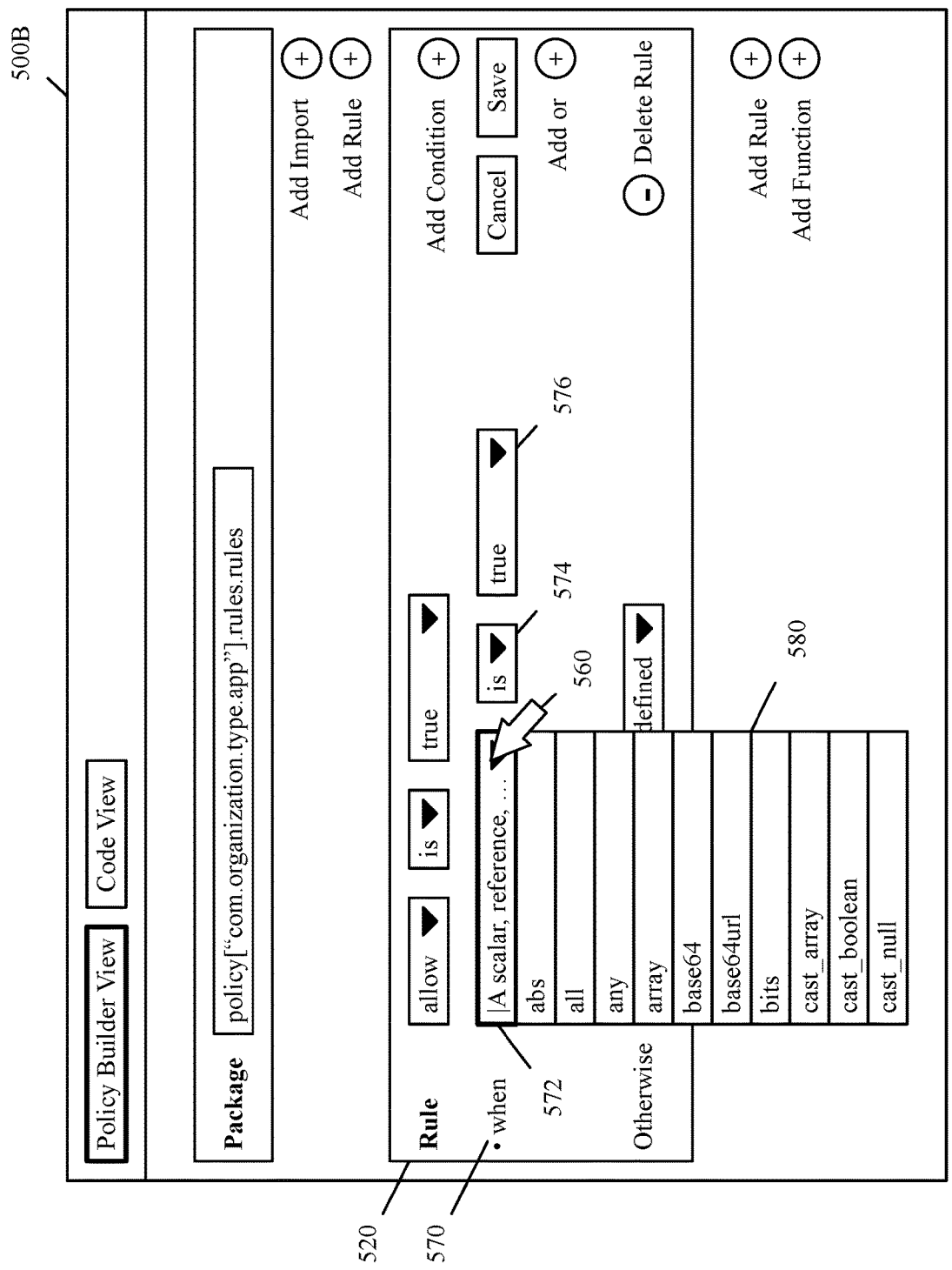

In response to the selection, the process displays (at 410) a new row within the rule, the new row including a set of three combo boxes to be populated by the user, with a dropdown menu of preset operand options under the first combo box. In some embodiments, the first and third combo boxes are for defining first and second operands, while the second (middle) combo box is for defining an operator. For example, FIG. 5B illustrates a new row 570 within the rule 520. The new row 570 includes a set of combo boxes 572-576, with the cursor 560 selecting the first combo box 572 that includes a dropdown menu of preset operand options 580. In some embodiments, the policy building application automatically displays the dropdown menu for the combo box when a user selects to add the new component. In other embodiments, the dropdown menu is only displayed when a user selects (e.g., via a cursor) a combo box.

Next, as the user provides input for the first combo box, the process displays (at 415) autocomplete operand suggestions based on the user input (i.e., based on any text entered into the combo box by the user). In some embodiments, when the user is entering an operand that is not included in the preset operand options, the process does not provide any autocomplete suggestions, and the operand must be completed manually. Also, some embodiments may provide additional, fewer, or different autocomplete suggestions than those illustrated. In some embodiments, both the preset options and the autocomplete suggestions vary by organization (i.e., a financial organization may have different preset options and suggestions than an engineering organization). The process then receives the completed first operand at 420.

Figure 5C:
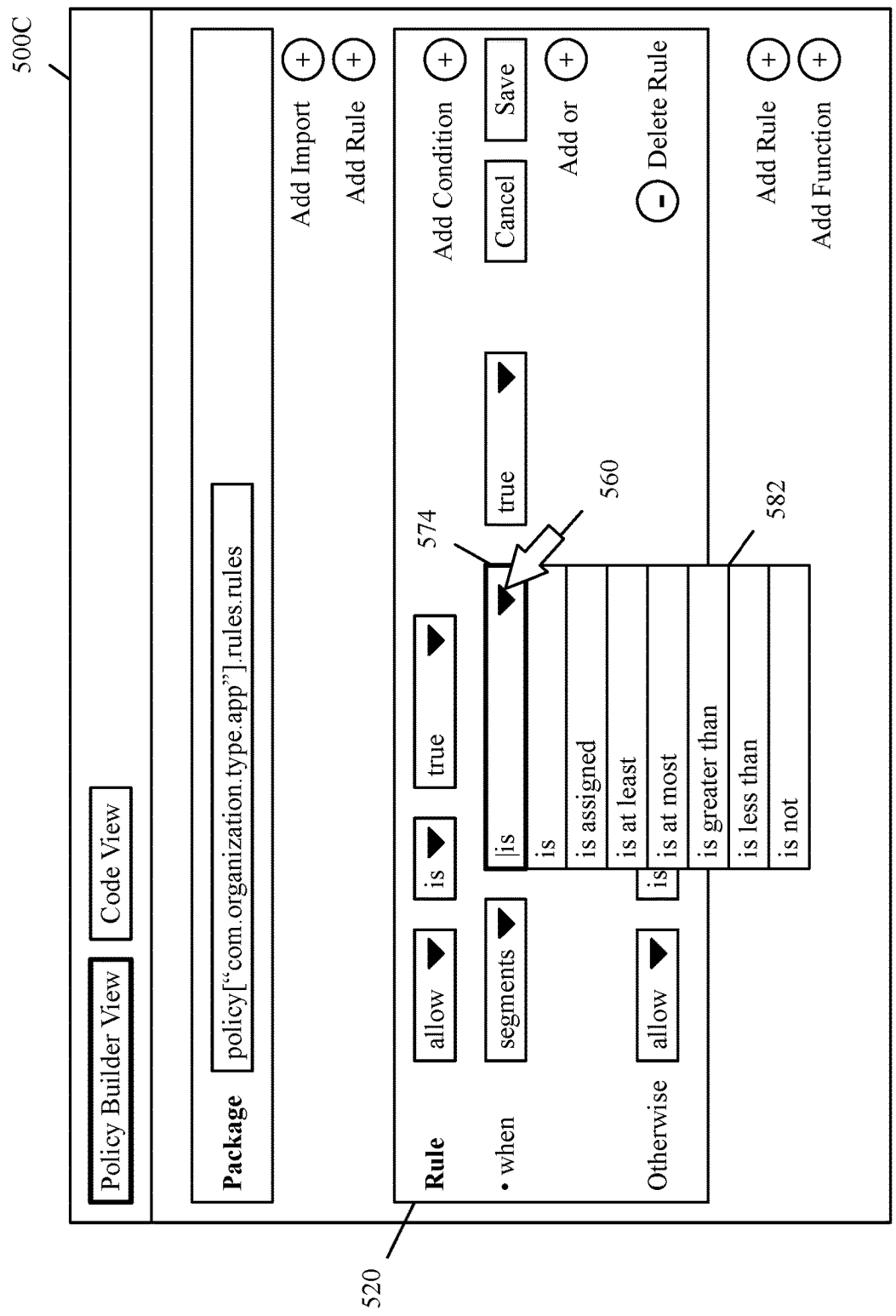

At 425, the process shifts the GUI interaction to the second combo box and displays a dropdown menu of operator suggestions that are based on the first operand entered in the first combo box. For example, FIG. 5C illustrates the cursor 560 selecting the second combo box 574. The second combo box 574 includes a dropdown menu 582 based on the first operand, "segments", shown in the first combo box 572. In some embodiments, once the policy building application receives the input for the first combo box, the application automatically shifts the GUI interaction to the second combo box, while in other embodiments, the shifted interaction is dependent on the user selecting the second combo box. Similar to the interaction for the first combo box, as the user provides input for the second combo box, the process displays (at 430) autocomplete operator suggestions based on the input (i.e., rather than the suggestions based on the first operand). The process then receives (at 435) the completed operator for the second combo box.

After receiving the completed operator, the process determines (at 440) whether the operator entered in the second combo box is a Boolean value (i.e., results in two possible values). When the process determines that the operator is a Boolean value, the process transitions to 445 to remove the third combo box from the display as it is rendered moot by the Boolean operator. The goal for this interaction, in some embodiments, is to simplify the policy builder view when it is not being edited so that it is easier for users to read.

In another example, the policy builder view may allow import statements to accept an optional alias. For instance, the policy builder view may display "[Example: data.servers] as [alias]", where the keyword "as" is inoperable (i.e., there is nothing for the user to select or change), and the "[alias]" field is present at all times while the row for that import is being edited, according to some embodiments. If the alias field has not been populated, or is populated with a default alias, when the user saves their changes for that import, the policy builder view in some embodiments removes the alias field from the display. Alternatively, if the alias field has been populated with a unique alias, when the user saves their changes, all three fields will remain in the display after saving.

Figure 5D:
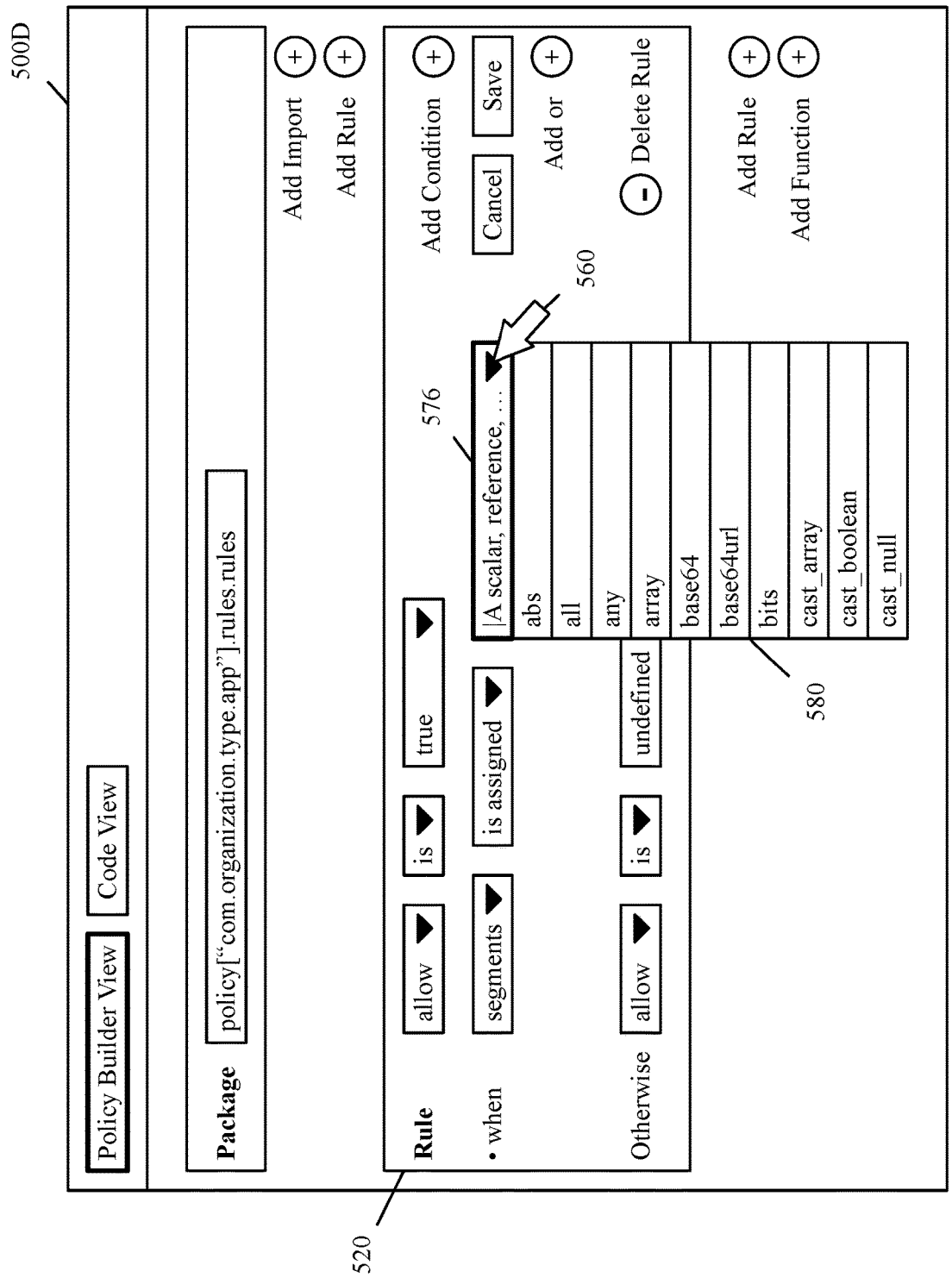

After removing the third combo box at 445, the process then transitions to 465 to determine whether the user has selected to save the new or modified rule. Otherwise, when the process determines (at 440) that the operator is not a Boolean value, the process transitions to 450 to shift the interaction to the third combo box and display a dropdown menu of preset operand options under the third combo box. In some embodiments, the preset operand options in the dropdown menu for the third combo box are the same preset operand options that were provided under the first combo box. For example, FIG. 5D illustrates the cursor 560 selecting the third combo box 576, which includes the dropdown menu of preset operand options 580.

Figure 5E:
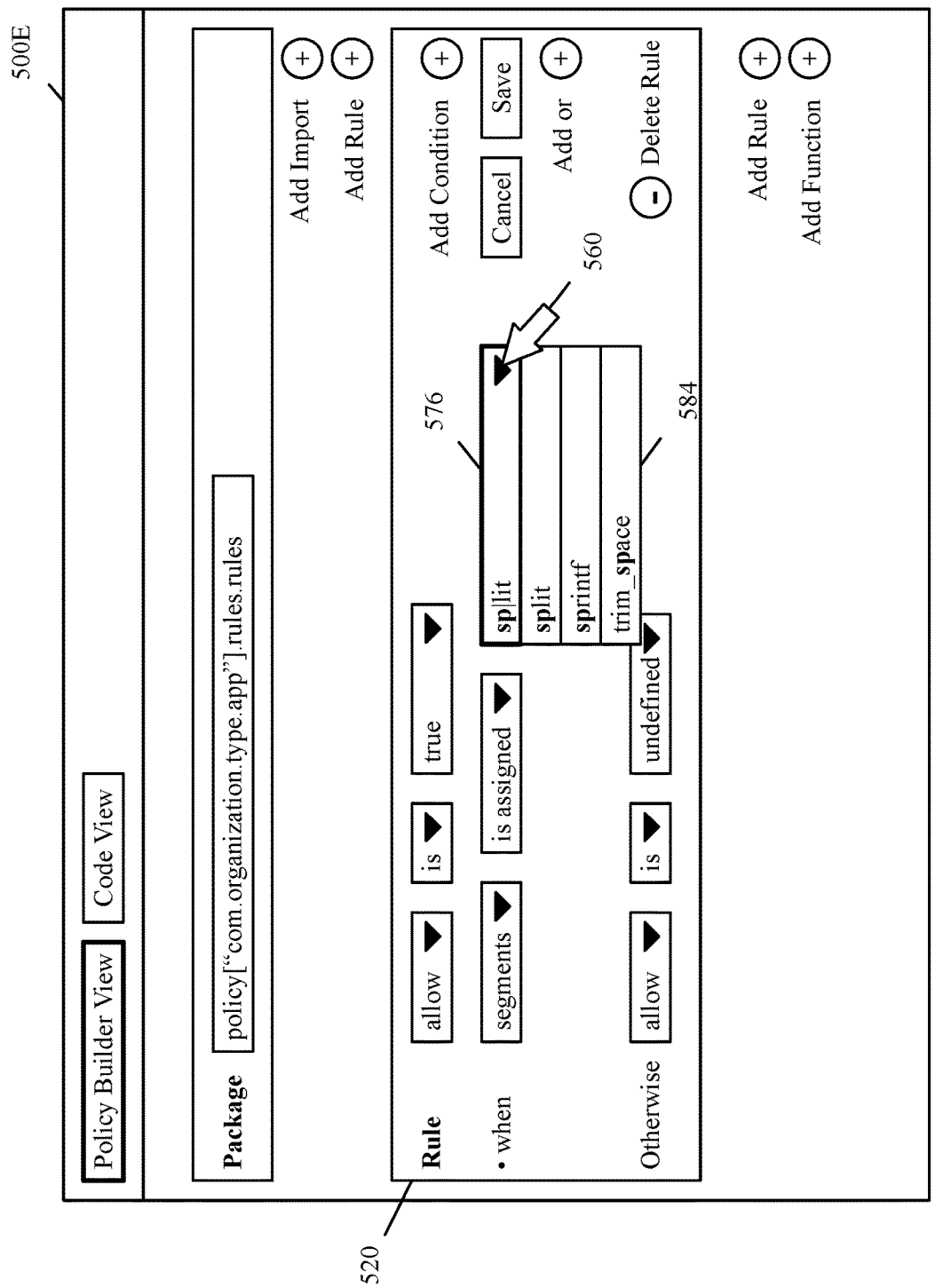

The process then displays (at 455) autocomplete suggestions based on any input from the user. For example, FIG. 5E illustrates a dropdown menu that includes a set of autocomplete suggestions 584 based on the initial input "sp" in the third combo box 576. In some embodiments, characters entered by the user appear bolded in order to differentiate them from the autocomplete suggestions. Other embodiments may differentiate the entered characters from the autocomplete suggestions using a different appearance other than, or in addition to, bolding, while still other embodiments may not differentiate between them at all.

Figure 5F:
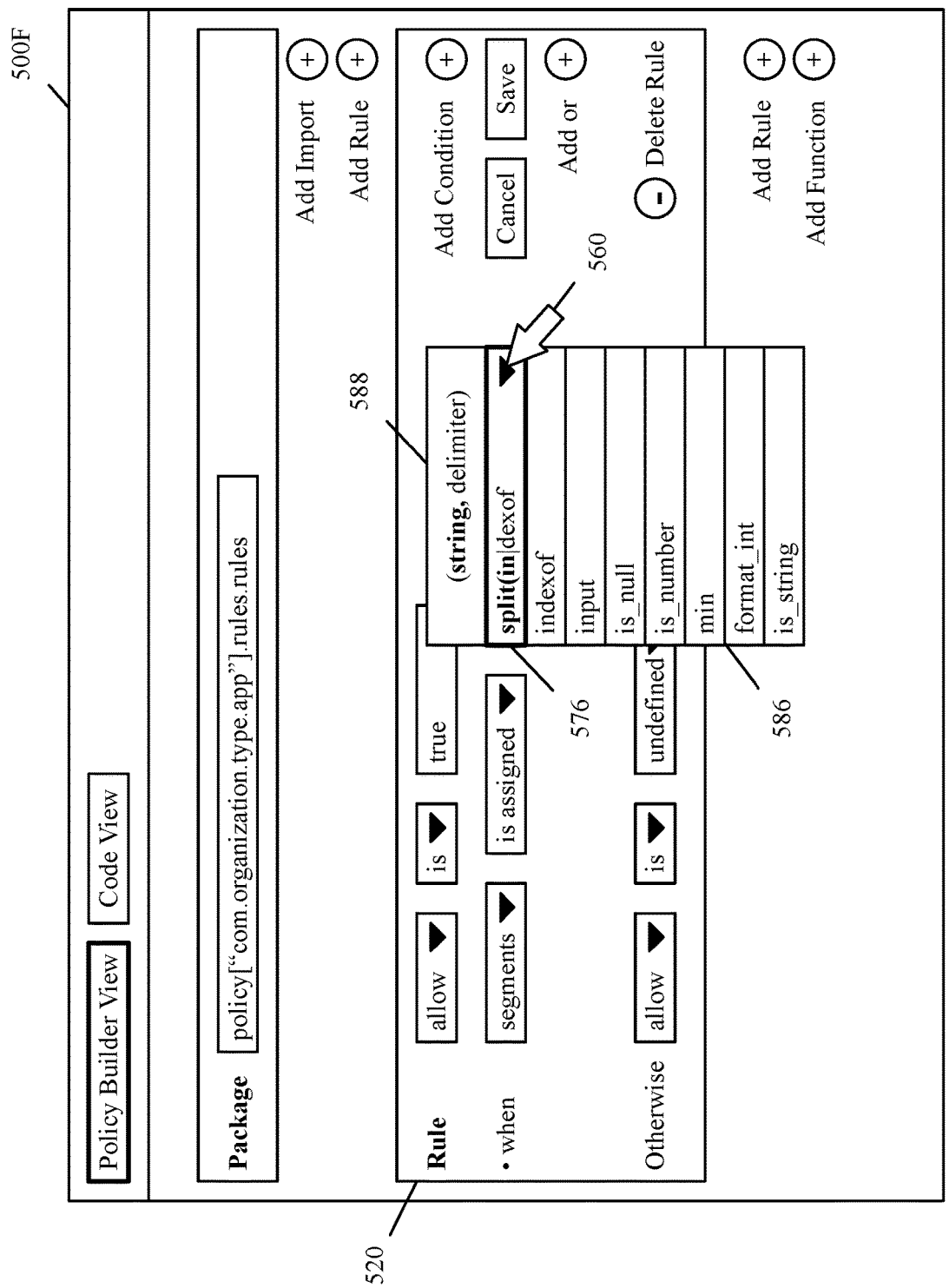

FIG. 5F further illustrates some additional capabilities of the autocomplete function. As shown, the dropdown menu under the third combo box 576 now includes a new set of autocomplete suggestions 586 for a first parameter based on the input "split(in". Additionally, a set of suggested parameters 588 for completing the second operand appear above the third combo box, with the first parameter, "string", appearing bolded to indicate that it is the active parameter based on the current input. Once the user has completed the first parameter, the second parameter will instead appear bolded to indicate that it is now the active parameter, according to some embodiments. When the application does not have useful suggestions for a particular parameter, some embodiments do not display a dropdown menu with suggestions, and the parameter must be completed manually.

Figure 5G:
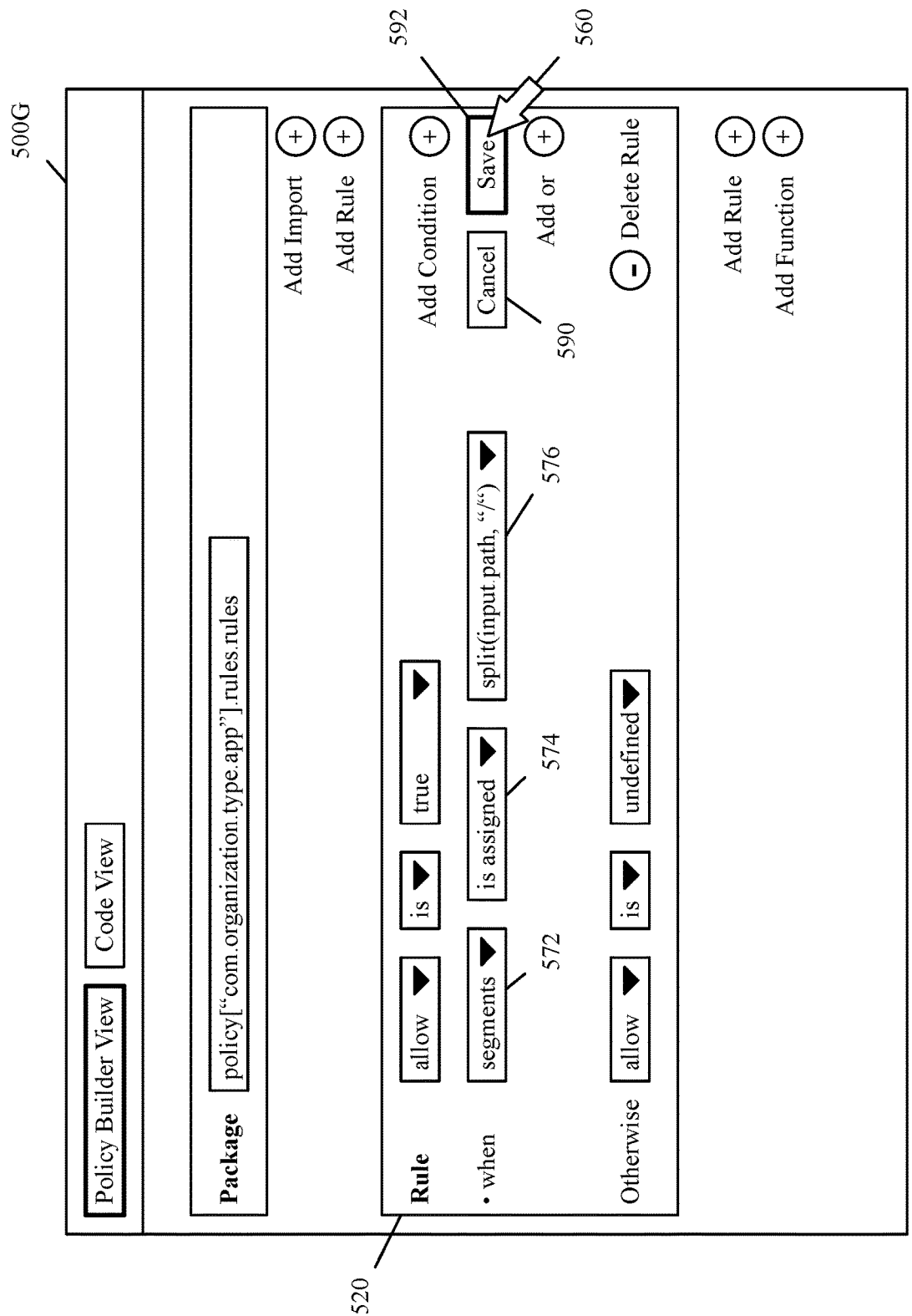

Returning to FIG. 4, the process 400 next receives (at 460) the completed operand for the third combo box. For example, FIG. 5G illustrates "split(input.path, "/")" as the completed input for the third combo box. The process then determines (at 465) whether the user has selected to save the new or modified rule. As shown in each of the FIGS. 5B-5H, the row 570 includes a set of selectable options 590-592 to either cancel the addition of the condition, or to save the added condition to the policy. When the process determines at 465 that the user has not selected to save the new rule or condition, the process transitions to 470 to cancel the addition of the new rule or condition and remove the new row from the display. The process then ends.

Figure 5H:
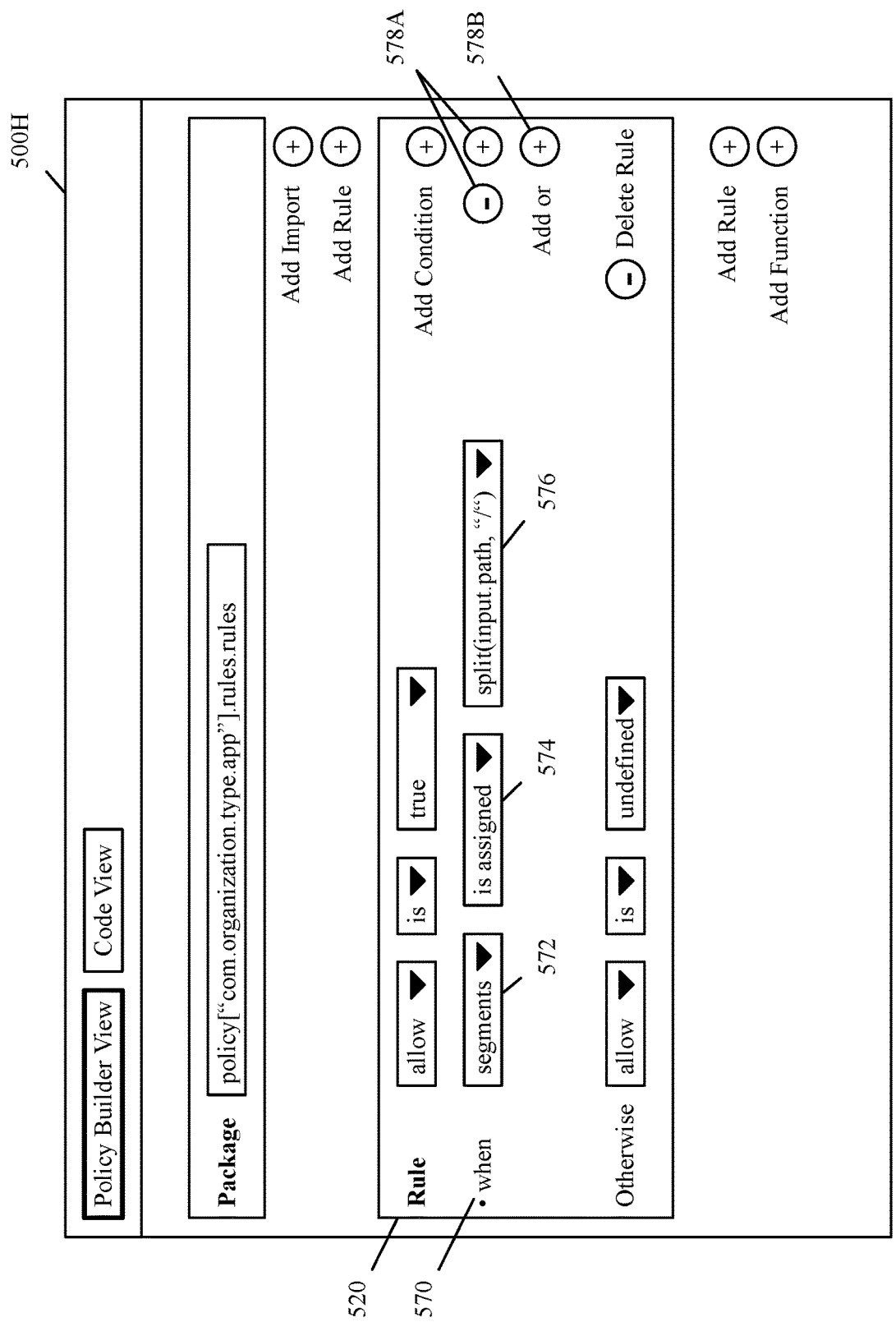

Otherwise, when the process determines at 465 that the user has selected to save the new rule or condition, the process transitions to 475 to update the policy as well as the policy builder view and the code view with the new or modified rule. For example, in FIG. 5G, the cursor 560 is illustrated as selecting the option 592 to save the added condition. FIG. 5H illustrates the saved policy which now includes the new condition in the row 570, along with a new set of controls 578A for editing or removing the condition and a control 578B for adding a new expression to the new condition. After the policy, policy builder view, and code view have been updated (e.g., according to the system 100), the process ends.

Figure 6:
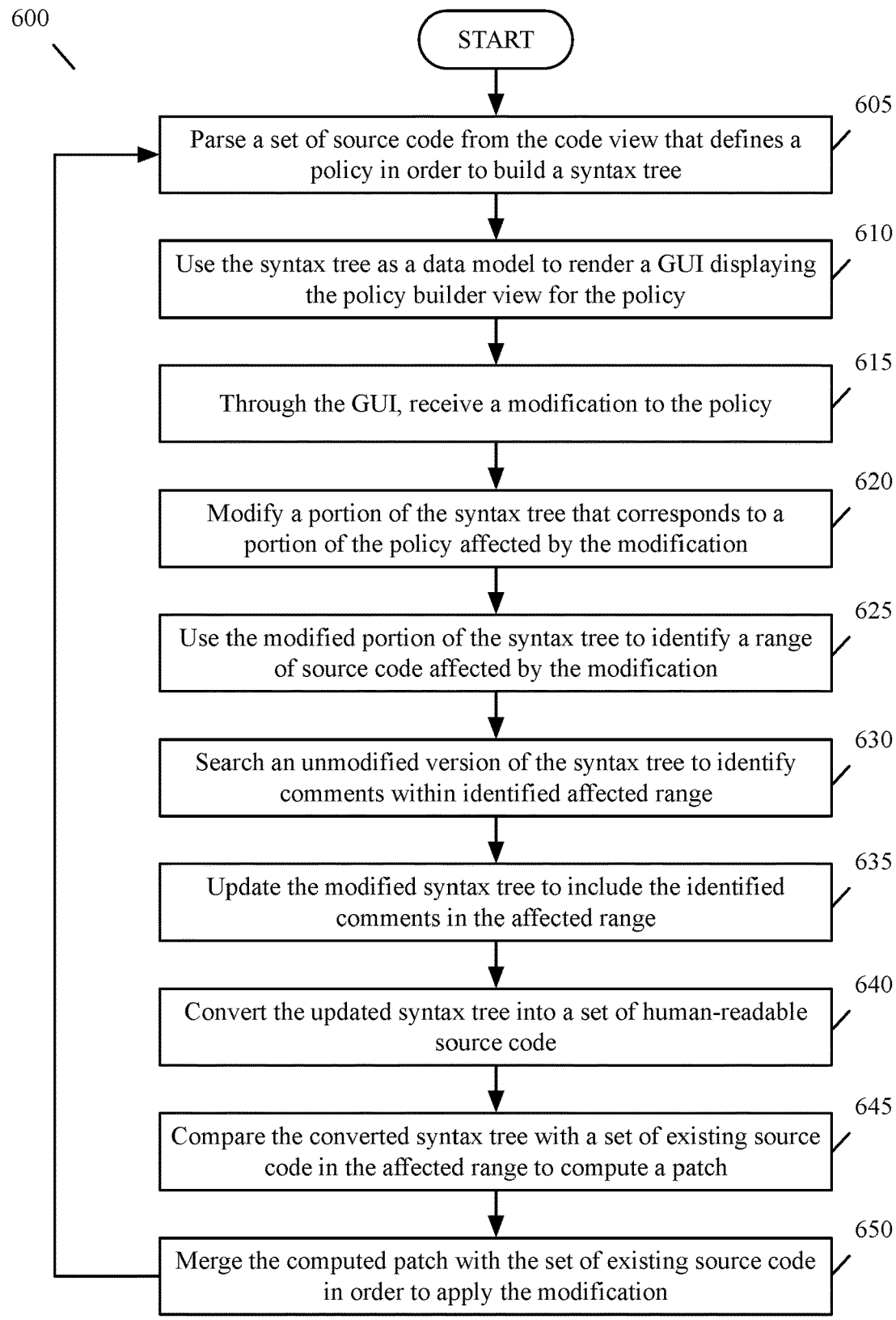
FIG. 6 illustrates a process performed by the policy building application when it receives a modification to a policy, according to some embodiments.

FIG. 6 illustrates a process that the policy building application in some embodiments performs when it receives a modification to a policy (e.g. following the process 400). The process 600 includes additional elaborations on the functions and processes described above for the system 100. As shown, the process 600 starts at 605 by parsing a set of source code (e.g., from the code view 110) that defines a policy in order to build an abstract syntax tree representing the policy. In some embodiments, the policy is a code-based policy that is written in a declarative language (e.g., Rego). Building the abstract syntax tree allows for all of the significant components and elements in the code defining the policy to be identified, categorized, and subsequently used to inform compilation and evaluation, according to some embodiments. For instance, the illustrative example of the syntax tree 120 includes the different components of the policy organized and categorized by rules, policy statements, import statement, and comments.

Next, the process uses the syntax tree as a data model to render (at 610) a GUI displaying the policy builder view for the policy. In some embodiments, different components of the GUI are responsible for handling different structures of the abstract syntax tree. Regardless of how the source code of the policy appears in the code view, the GUI will continue to group like-components in the corresponding policy builder view, according to some embodiments. For example, if a user enters a new import at the bottom of the code in the code view, the new import will be interleaved at the top of the display in the policy builder view with the rest of the imports for the policy. Doing so encourages a consistent view for users of the policy building application so that when a user comes to a policy, they have the ability to read the policy regardless of how many other users may have modified the underlying source code for the policy as the policy builder view will always display the policy handle at the top, followed by imports, then rules, then functions.

After rendering the GUI, the process receives (at 615) a modification to the policy through the GUI. The modification in some embodiments can include the addition, modification, or removal of any of the components (e.g., imports, rules, and functions) that define the policy. The condition added to the rule described above in FIGS. 5A-5H is one example of a modification that can be made to a policy.

The process next modifies (at 620) a portion of the syntax tree that corresponds to a portion of the policy affected by the modification. For instance, in the example system 100, if a user were to add a new import to the policy from the policy builder view 130, only a portion of the "I" branch of the syntax tree 120, which represents imports defined for the policy, would be affected and modified. The rest of the syntax tree would remain untouched, according to some embodiments.

At 625, the process uses the modified portion of the syntax tree to identify a range of source code affected by the modification. In some embodiments, the policy building application does this by calculating source code offsets from the first identified line or character of affected source code through the last identified line or character of affected source code. The process then searches (at 630) an unmodified version of the syntax tree to identify comments within the affected range (e.g., by searching the "C" portion of the syntax tree 120 within the affected range).

The process next updates (at 635) the modified version of the syntax tree to include the identified comments in the affected range, which further ensures consistency of the file. For example, if a first user inserts a comment for a policy within the code view, and a second user makes a subsequent modification in the policy builder view to the policy that affects a range of code that includes the comment from the first user, the policy building application will check an unmodified version of the syntax tree for comments within that range of code, thus ensuring that the comment from the first user is not lost when updating the portion of code affected by the second user's modification since comments are organized separately from the other components of the policy within the syntax tree.

Once the modified syntax tree has been updated with the comments, the process converts (at 640) the updated syntax tree into a set of human-readable source code. The process then compares (at 645) the converted syntax tree with the set of source code (e.g., from the code view) in the identified range to compute a patch that includes any differences (e.g., the modification) between the converted syntax tree and set of source code. The computed patch corresponds to the syntax tree fragments added to the syntax tree in the example system 100.

At 650, the process merges the computed patch with the set of source code in order to apply the modification. In some embodiments, merging the patch with the set of source code to apply the modification further ensures that only the portion of the code corresponding to the modified portion of the policy is affected by the modification in some embodiments. After the patch and existing source code are merged, the process returns to 605 to parse the set of source code from the code view to build a syntax tree (i.e., a new syntax tree).

FIGS. 7A-7H illustrate a set of code view and policy builder view GUIs for a policy, and how these views change as modifications to the policy are made through the policy builder view GUIs. FIG. 7A illustrates a GUI displaying a policy builder view 701A of a policy for authorizing access to salary information.

The policy builder view 701A also includes several components that have already been defined for the policy. As illustrated, the policy includes a policy handle 710 ("finance.salary"), imports 720, a rule 730, and a function 740. The imports 720 include one import 722, "data.subordinates". The rule 730 includes a first expression 732 for allowing users to access their own salaries, a second expression 734 for allowing managers to access the salaries of their subordinates, and a default expression 736. Lastly, the function 740 includes an expression 742 for determining whether a user has subordinates.

FIG. 7B illustrates the GUI displaying a code view 702A of the policy for authorizing access to salary information. As shown, while the code view 702A includes all of the components displayed in the policy builder view 701A, the components do not appear in the same order. For example, line 1 of the code view 702A includes the policy handle 710 for the policy, which is then followed in line 3 by the default expression 736 for the rule 730.

Next, line 5 of the code view 702A includes a first comment 750, "# Authorize users to get their own salary." to indicate the purpose of the first expression 732, which appears in lines 6-11 of the code view, for the rule 730. The import 722 then appears in line 13 of the code, followed by the function 740 in lines 15-17. Line 19 includes a second comment 752, "# Authorize manages to get their subordinates' salaries." to indicate the purpose of the second expression 734, which appears in lines 20-25, for the rule 730. Other embodiments can include any number of comments for any number of purposes. For example, some embodiments can include comments describing each component defined for a policy, while other embodiments might not include any comments at all.

In some embodiments, while the component types (i.e., imports, rules, and functions) are maintained in a particular order within the policy builder view regardless of their order within the code view, the order of individual components within their groupings is mirrored between the policy builder view and the code view. As a result, components added through the policy builder view are interleaved in the code view in the same order in which they are added through the policy builder view, according to some embodiments. For example, FIG. 7C illustrates an updated version 701B of the policy builder view 701A.

The policy builder view 701B includes a new import 724, "data.human resources" within the imports 720, added by a user through the controls 770. As illustrated in the code view 702A of FIG. 7B, the import 722 appears after the default expression 736 and first expression 732 of the rule 730. Thus, to maintain the order of component types within the policy builder view, while also maintaining the order of the individual components as they are displayed in the code view, the new import 724 is displayed above the existing import 722 within the policy builder view, and will be interleaved as such within the code view, as described below.

FIG. 7D illustrates an updated version 702B of the code view 702A that reflects the addition of the import 724 made through the policy builder view. As shown, the new import 724 appears in line 3 of the code view 702B, directly following the policy handle 710 and directly above the default expression 736, thus maintaining the order of the component types as they are added in the policy builder view 701B (i.e., imports directly follow the policy handle), as well as the order of individual components from the code view 702A (i.e., import 722 has not been moved, despite the addition of a new import). If a user decided to move the import 724 from line 3 to somewhere below the import 722 within the code view, the policy builder view would reflect the change and display the import 722 above the import 724 within the imports 720.

FIG. 7E illustrates an updated version 701C of the policy builder view 701B. The policy builder view 701C includes a new function 744 with an expression 746, added below the existing function 740 (e.g., by using the add function control). The new function 744 determines whether a user not only has subordinates, but also whether the user is from human resources. While the new function 744 is added after the existing import 740, the policy builder view GUI also provides tools to add new functions above existing functions, according to some embodiments.

FIG. 7F illustrates an updated version 702C of the code view 702B. The code view 702C reflects the new function 744, which appears in lines 29 through 31. Rather than directly following the first function 740, the new function 744 is added at the end of the code view 702C, after the second condition 734 of the rule 730, to maintain the order of the components in the policy builder view 701C through which a function cannot be added before a rule.

FIG. 7G illustrates an updated version 701D of the policy builder view 701C. The policy builder view 701D includes a new expression 738 added to the rule 730 below the existing expressions 732 and 734 (e.g., using the controls 772). The new expression 738 specifies that users from the human resources department are allowed to access the salaries of any users. As shown, each of the expressions 732 and 734 include four rows, while the new expression 738 includes three rows. If a user wants to add additional rows (i.e., conditions) to any of the expressions defined for the rule 730, the policy builder view provides a set of controls for each expression that allow the user to remove a row from the expression, or to add an additional row to the expression.

FIG. 7H illustrates an updated version 702D of the code view 702C. The code view 702D reflects the added expression 738 in lines 30-34, directly following the second expression 734 and above the function 744 in keeping with the order of the components in the policy builder view 701D. If a user added or moved an import, for example, between the expression 734 and the function 744 prior to the addition of the new expression 738, the new expression 738 would instead appear directly after the added or moved import based on the order of component types from the policy builder view (i.e., rules cannot be added above imports). In addition to the new expression 738, a new comment 754, "# Authorize HR members to get anyone's salary." has been inserted in line 29 directly above the added expression 738 to indicate the purpose of the new expression.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
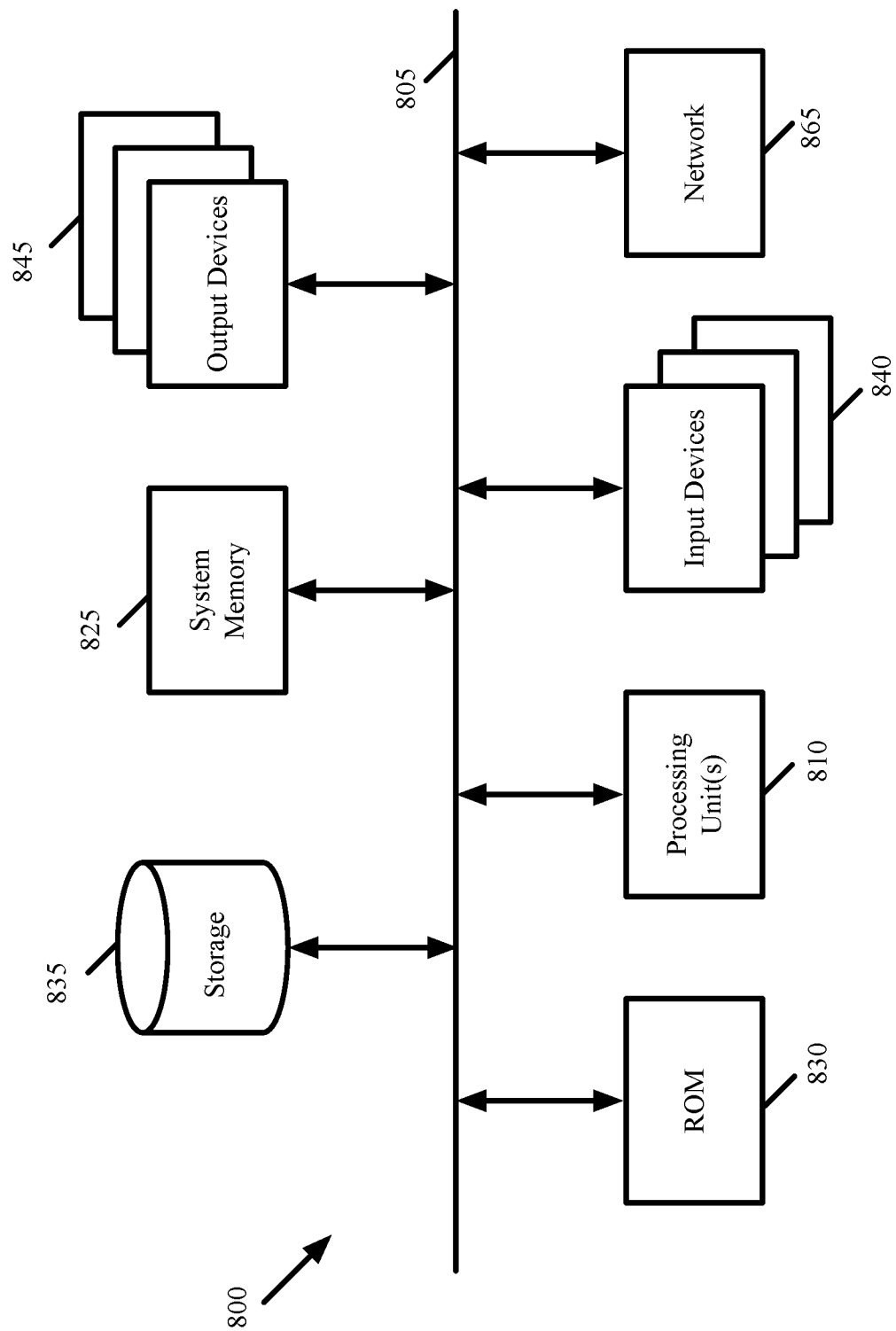
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. The electronic system 800 is also the control plane modules of the load balancer of some embodiments. As shown, the electronic system includes various types of computer readable media and interfaces for various other types of computer readable media. Specifically, the electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory (ROM) 830, the system memory 825, and the permanent storage device 835. From these various memory units, the processing unit(s) 810 retrieve instructions to execute and data to process in order to execute the processes of the invention. The processing unit(s) may be a single processor or a multi-core processor in different embodiments.

The ROM 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures conceptually illustrate processes and state diagrams (e.g., FIGS. 3, 4, and 6). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

The invention claimed is:

1. A method for defining code-based policies, the method comprising:
    generating a policy-builder first view of a policy for display in a graphical user interface (GUI) by processing a syntax tree that is generated from a code second view of the policy;
    receiving, through the policy-builder first view, a modification to a portion of the policy;
    to reflect the modification, updating a portion of the syntax tree that corresponds to the portion of the policy that is affected by the modification; and
    based on the updated syntax tree, updating the code second view by modifying a portion of the code second view that corresponds to the updated portion of the syntax tree, wherein said updating the code second view comprises:
        converting the updated syntax tree into a set of human-readable source code;
        comparing the set of human-readable source code with a set of source code from the code second view within the affected range in order to identify differences; and
        computing a patch comprising the identified differences to be merged with the set of source code in order to update the code second view.

2. The method of claim 1, wherein:
the policy comprises a plurality of components;
the policy-builder first view displays the plurality of components in a first order;
the code second view displays the plurality of components in a second order; and
the syntax tree reflects the plurality of components in a third order.

3. The method of claim 2, wherein:
the modification to the policy portion modifies at least one component of the policy;
updating the syntax tree comprises updating the portion of the syntax tree that relates to the modified component of the policy; and
updating the code second view comprises updating the portion of the code second view relating to the modified component of the policy.

4. The method of claim 1, wherein merging the patch with the set of source code triggers a parse of the policy.

5. The method of claim 4, wherein the policy is parsed following each modification to the policy.

6. The method of claim 1,
wherein the syntax tree is generated from the code second view by parsing a set of source code from the code second view,
wherein generating the policy-builder first view by processing the syntax tree further comprises using the parsed syntax tree as a data model for the GUI.

7. The method of claim 3, wherein the components comprise imports, rules, and functions.

8. The method of claim 1, wherein the set of source code is written in a declarative language.

9. The method of claim 1 further comprising providing, through the GUI, a set of selectable menu options for toggling between the policy-builder first view and the code second view.

10. A non-transitory machine readable medium storing a program for execution by a set of processing units, the program for defining code-based policies, the program comprising sets of instructions for:
generating a policy-builder first view of a policy for display in a graphical user interface (GUI) by processing a syntax tree that is generated from a code second view of the policy;
receiving, through the policy-builder first view, a modification to a portion of the policy;
to reflect the modification, updating a portion of the syntax tree that corresponds to the portion of the policy that is affected by the modification; and
based on the updating of the syntax tree, updating the code second view by modifying a portion of the code second view that corresponds to the updated portion of the syntax tree, said set of instructions for updating the code second view comprising sets of instructions for:
converting the updated syntax tree into a set of human-readable source code;
comparing the set of human-readable source code with a set of source code from the code second view within the affected range in order to identify differences; and
computing a patch comprising the identified differences to be merged with the set of source code in order to update the code second view.

11. The non-transitory machine readable medium of claim 10, wherein:
the policy comprises a plurality of components;
the policy-builder first view displays the plurality of components in a first order;
the code second view displays the plurality of components in a second order; and
the syntax tree reflects the plurality of components in a third order.

12. The non-transitory machine readable medium of claim 11, wherein:
the modification to the policy portion modifies at least one component of the policy;
the set of instructions for updating the syntax tree comprises a set of instructions for updating the portion of the syntax tree that relates to the modified component of the policy; and
the set of instructions for updating the code second view comprises as set of instructions for updating the portion of the code second view relating to the modified component of the policy.

13. The non-transitory machine readable medium of claim 10,
wherein merging the patch with the set of source code triggers a parse of the policy, and
wherein the policy is parsed following each modification to the policy.

14. The non-transitory machine readable medium of claim 10,
wherein the syntax tree is generated from the code second view by parsing a set of source code from the code second view,
wherein generating the policy-builder first view by processing the syntax tree further comprises a set of instructions for using the parsed syntax tree as a data model for the GUI.

15. The non-transitory machine readable medium of claim 12, wherein the components comprise imports, rules, and functions.

* * * * *